Nick A. Schuster
INVENTOR

BY Edward M. Roney
ATTORNEY

July 22, 1969
N. A. SCHUSTER
3,457,500
METHODS AND APPARATUS FOR IMPROVING THE RESOLUTION OF
WELL LOGGING MEASUREMENTS
Filed June 5, 1967
8 Sheets-Sheet 2
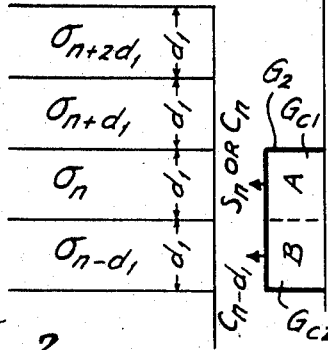
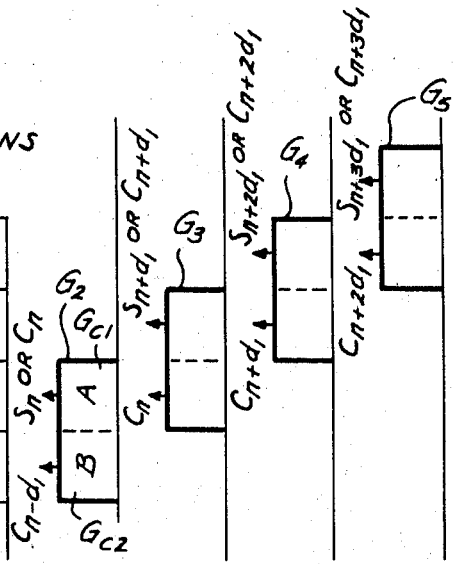
Fig. 2
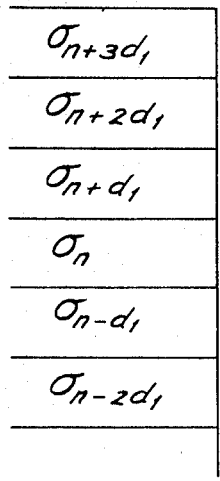
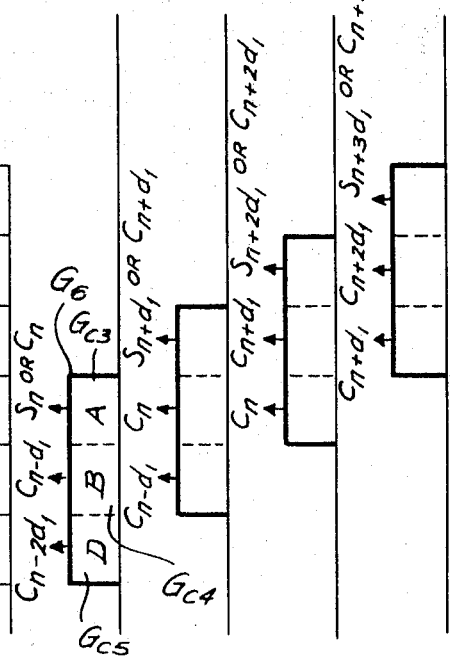
Fig. 13
Nick A. Schuster
INVENTOR
BY Edward M. Roney
ATTORNEY Nick A. Schuster
INVENTOR BY Edward M. Roney

ATTORNEY

Nick A. Schuster
INVENTOR

BY Edward M. Roney
ATTORNEY

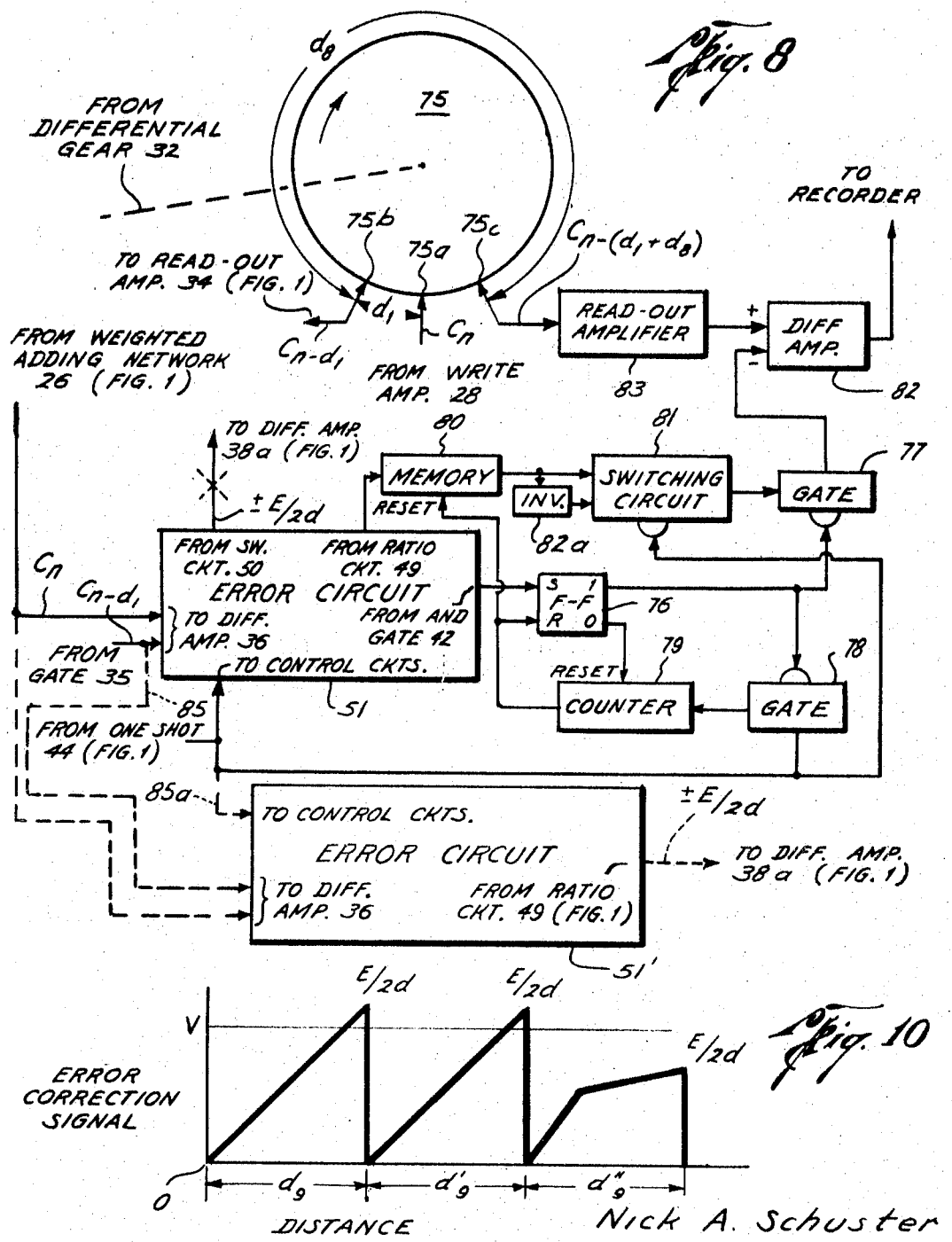

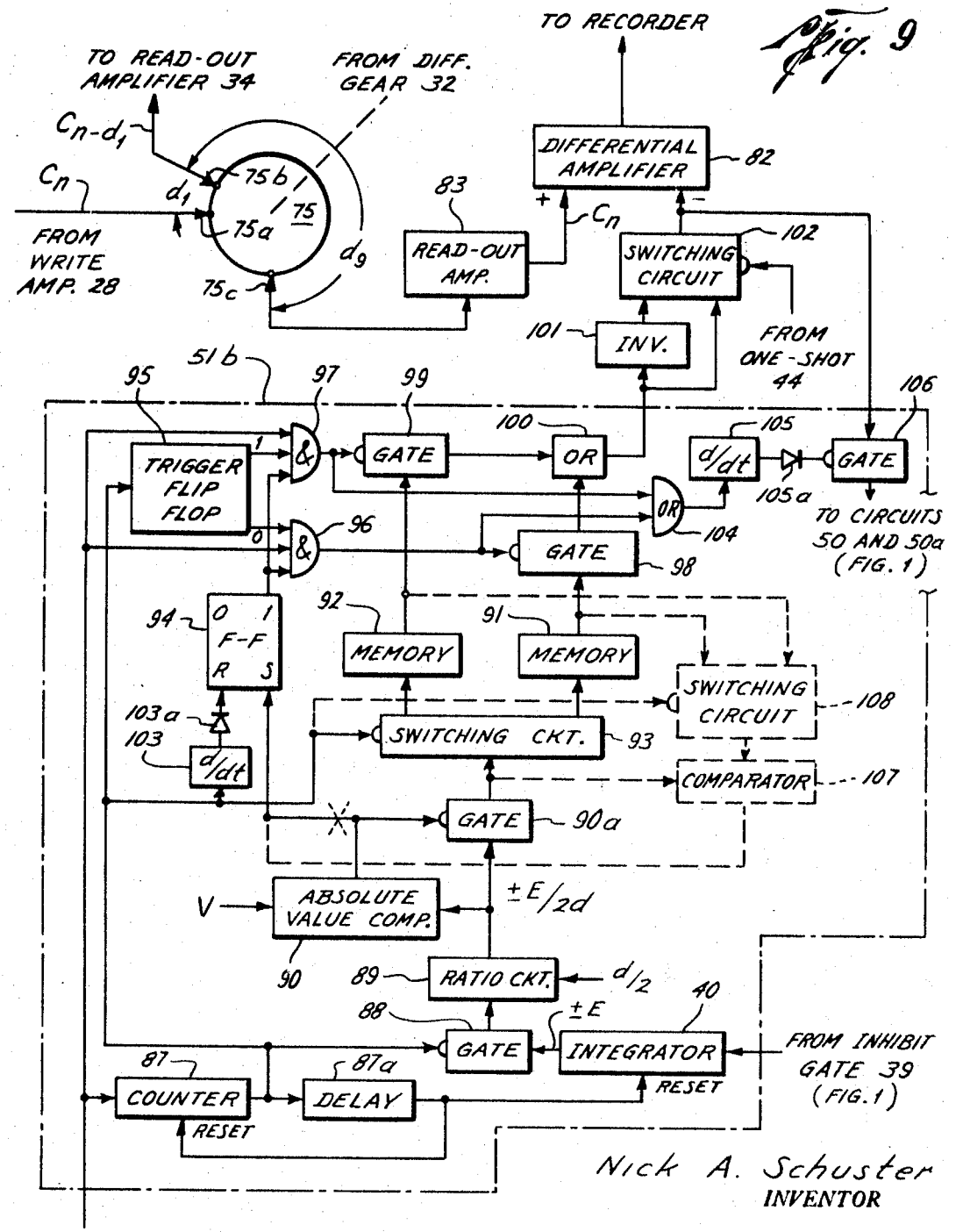

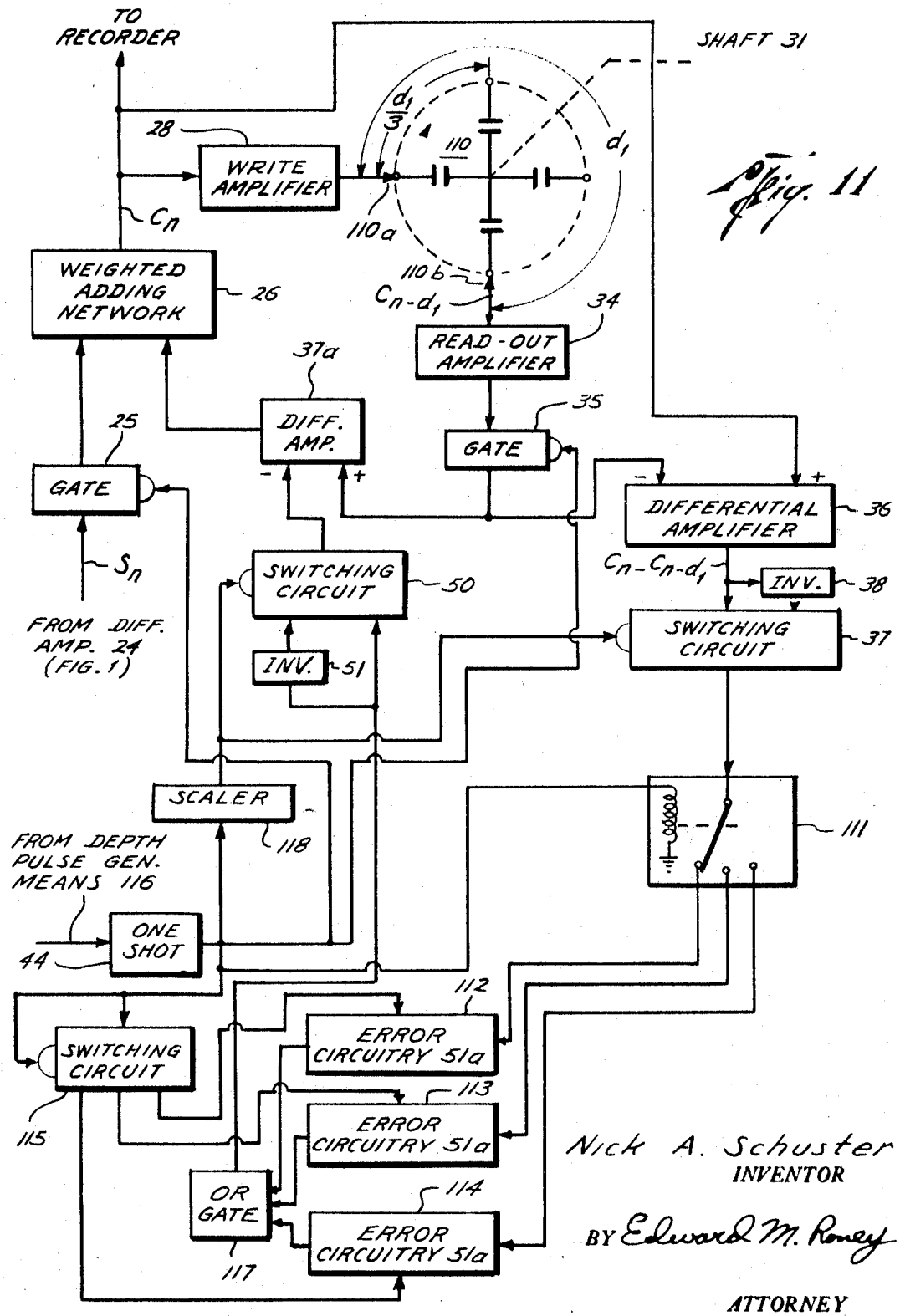

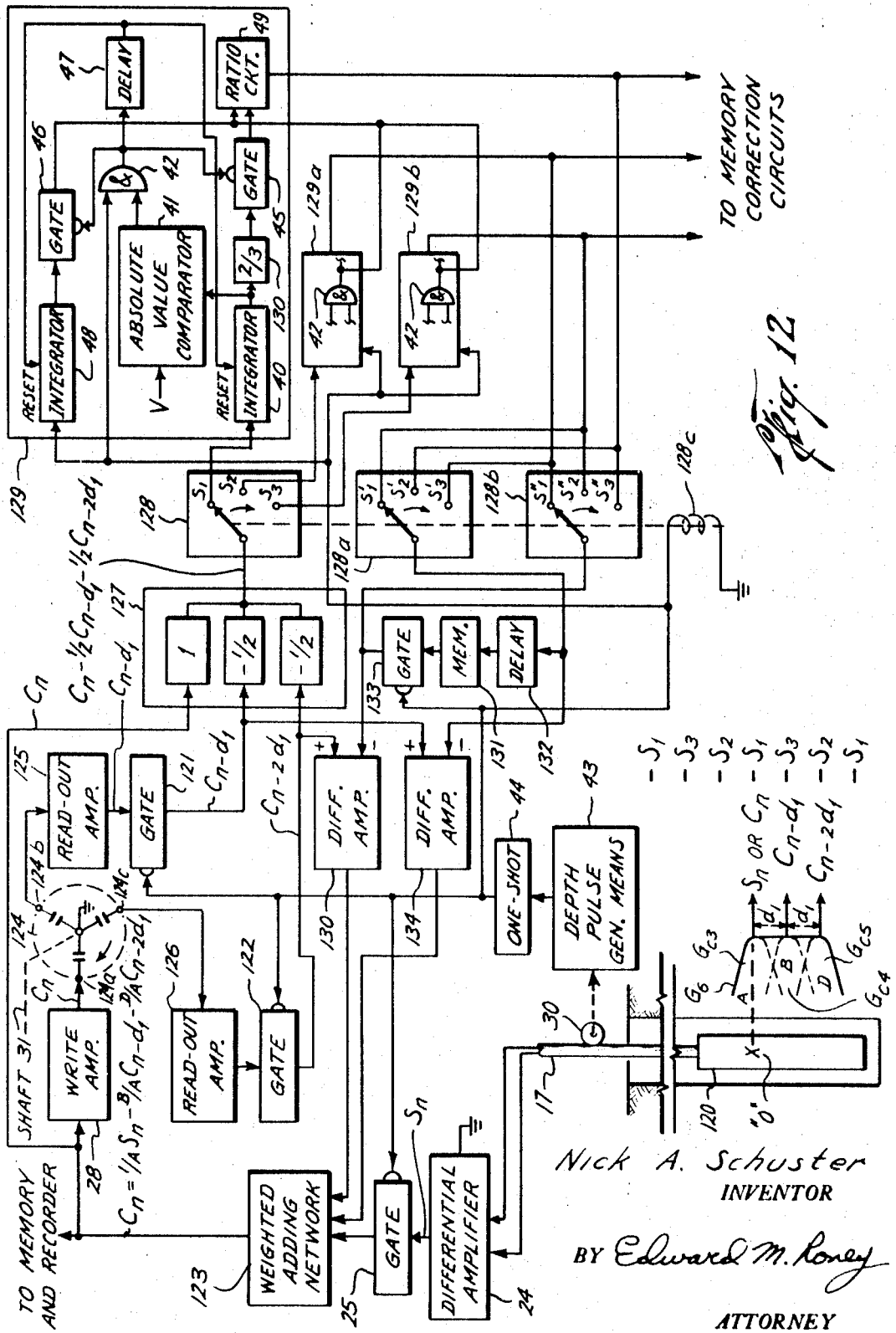

United States Patent Office 3,457,500
Patented July 22, 1969

3,457,500
METHODS AND APPARATUS FOR IMPROVING THE RESOLUTION OF WELL LOGGING MEASUREMENTS
Nick A. Schuster, Houston, Tex., assignor to Schlumberger Technology Corporation, Houston, Tex., a corporation of Texas
Filed June 5, 1967, Ser. No. 643,582
Int. Cl. G01v 3/18
U.S. Cl. 324—1       26 Claims

ABSTRACT OF THE DISCLOSURE

The disclosure of this invention describes an error correction technique for use with signal processing apparatus of the type wherein a signal derived from well logging appratus for investigating subsurface earth formations is combined with at least one other signal in a desired manner to produce a computed signal. The computed signal, which is an improved indication of the subsurface formations, is stored in memory and subsequently read out for combination with a new derived signal to produce a new computed signal. The error correction technique involves applying various logic schemes to the computed signals, based on certain relationships which describe the propagation of errors from one computed signal to the next. For example, in one case, the error was found to propagate in an oscillatory manner. Apparatus is shown for finding this error, based on this oscillatory propagation, which apparatus subtracts one computed signal from the next and reverses the polarity of the difference signal from time to time. The varying polarity difference signal is then integrated, the integrated value being used to determine the presence of an error in accordance with various logic schemes. To insure that true formation signals are not being confused as errors, a sufficiently long interval of the formations is considered to satisfy the probability that the true earth formation values will not have such an oscillatory nature over a long interval.

---

This invention relates to signal processing methods and apparatus for processing well logging measurement signals for providing improved indications of subsurface conditions or characteristics.

In the logging of subsurface earth formations surrounding a borehole drilled into the earth, investigating apparatus is moved through the borehole and investigates the surrounding earth formations to provide an output signal which varies in accordance with variations of the investigated characteristic of the adjoining earth formations. In electrical logging, for example, the output signal varies in accordance with the electrical resistivity or conductivity of the subsurface earth formations. In any case, it is often desirable that the investigating apparatus respond to only a relatively limited portion of the formation material which is adjacent the apparatus at any given instant. For example, it is frequently desired that the vertical resolution of the investigating apparatus be sensitive to only a limited vertical interval of the adjoining earth formations. By so doing, earth formation beds can be more accurately investigated.

When speaking of vertical resolution of an investigating apparatus, the vertical geometrical factor (hereinafter called V.G.F.) is frequently utilized to more accurately describe this vertical resolution. The V.G.F. of an induction logging type investigating apparatus, for example, can be defined as the relative response of the investigating apparatus as a function of relative borehole depth as the investigating apparatus passes from $-\infty$ to $+\infty$ through a thin conductive bed extending radially outward from the borehole to infinity and surrounded by beds of zero conductivity. To make it eariser to use, the V.G.F. is usually normalized to "one." Thus, $$\int_{-\infty}^{+\infty} X \, dz$$

is made equal to "one" where X is the relative response and $dz$ is a depth increment along the borehole axis. This same procedure can be used to find the V.G.F. if other formation characteristics than conductivity (or its reciprocal, resistivity) are being investigated, i.e. if other than induction logging type investigating apparatus is being utilized.

However, many investigating apparatus respond to a greater vertical region than desired (i.e., they do not have the most desirable V.G.F.). One technique for correcting this is to provide additional transducer elements in the downhole investigating apparatus to compensate for or to cancel the undesired portion of the response so that the effective vertical resolution of the apparatus is substantially improved. For example, in logging by electromagnetic principles, which is referred to as "induction logging", so-called "focusing" coils are added to the downhole investigating apparatus to cancel to a large extent the response of the apparatus to the so-called "shoulder" regions lying immediately above and below the desired vertical region of response of the investigating apparatus. However, further problems arise whenever additional transducer elements are added. One such problem is that more apparatus must be placed in the downhole investigating apparatus thus making the downhole investigating apparatus more complex and usually more expensive. Because of harsh downhole environmental conditions, it is desirable to move circuit complexities to the surface of the earth. Other problems concerning the quality of the measurement may also occur. For example, in induction logging, as more coils are added to improve the vertical focusing, the depth of the investigation of the apparatus in a horizontal or radial direction tends to decrease.

Another way of improving the effective vertical resolution of the downhole investigating apparatus is by utilizing the signal processing or computing techniques set forth in U.S. Patent No. 3,166,709 granted to H. G. Doll on Jan. 19, 1965. This Doll patent teaches the principle of temporarily storing or memorizing well logging signals obtained at various vertically spaced depth levels in the borehole. These stored signals are then combined in an appropriate manner to produce a resultant signal corresponding to the signal that would have been obtained with an investigating apparatus having better vertical resolution. This process is sometimes referred to as "computed focusing." The resultant signal is a computed signal and the relative depth levels corresponding to the stored signals which are being combined at any given instant are called computing stations. These computing stations are defined relative to the investigating apparatus, and therefore effectively move through the borehole as the investigating apparatus moves through the borehole. The relative depth level to which the resultant signal is referenced is called the center point or recording point of the investigating system.

In following the teachings of the above-named Doll patent, it would sometimes be desirable to provide computing stations at a large number of measurement levels in the borehole such as in those cases where the total signal received by the investigating apparatus is made up of contributions from a relatively great distance from the center point or recording point of the downhole investigating apparatus. However, to accomplish this, a relative large capacity memory would be required to store the necessary number of well logging measurement signal samples.

Another way of improving the vertical resolution by signal processing techniques are the techniques shown in copending application Ser. No. 605,424 by Nick A. Schuster, filed on Dec. 28, 1966. Among other things, these techniques enable the use of a much larger effective number of computing stations for a memory system of given capacity. In a more general sense they enable more sophisticated forms of signal processing to be performed with relatively small memory systems of convenient size for use at the well site. Utilizing the signal processing techniques of the Schuster copending application, any errors introduced into the signal processing system will be automatically and quickly eliminated for investigating apparatus having many types of V.G.F.'s However, some investigating apparatus may have V.G.F.'s which do not lend themselves to this automatic cancellation of errors. The present application describes a technique which can be utilized in accordance with the previous Schuster copending application to correct for errors which have crept into the signal processing system.

It is an object of the invention therefore, to provide new and improved methods and apparatus for processing well logging measurement signals wherein more accurate measurements can be obtained.

It is another object of the invention to provide new and improved methods and apparatus for processing well logging measurement signals wherein errors induced into the signal processing system can be corrected.

In accordance with one feature of the present invention, apparatus for processing well logging signals comprises means for deriving signals representative of a characteristic of the earth formations surrounding a borehole and combining means for combining selected derived signals with at least one other signal to provide computed signals representative of the formation characteristic at given depth levels correlated with the depth levels of the derived signals. The apparatus further comprises memory means for storing the computed signals, means for reading out the computed signals from the memory means and supplying at least one read-out computed signal to the combining means for combination with the derived signals to cancel out a selected formation response portion of each derived signal, i.e., a selected portion of the derived signal V.G.F. The apparatus further comprises means responsive to the relative amplitude of selected computed signals, at least one of which is a read-out computed signal, for detecting the presence of an error in the computed signals and cancelling out the detected error in at least one computed signal.

In accordance with another feature of the present invention, a method of processing well logging signals comprises deriving signals representative of a characteristic of the earth formations surrounding a borehole and combining selected derived signals with at least one other signal to provide computed signals representative of the formation characteristic at given depth levels correlated with the depth levels of the derived signals. The method further comprises storing the computed signals, reading out the computed signals from the memory means and supplying at least one read-out computed signal to the combining means for combination with each derived signal to cancel out a selected portion of the formation response of each derived signal. The method further comprises detecting the presence of an error in the computed signals in response to selected computed signals, at least one of which is a read-out computed signal, and cancelling out the detected error in at least one computed signal.

For a better understanding of the present invention, together with other and further objects thereof, reference is had to the following description taken in connection with the accompanying drawings, the scope of the invention being pointed out in the appended claims.

Referring to the drawings:

FIGURE 2 shows the V.G.F. of the downhole investigating apparatus of FIGURE 1 at various depth levels in the borehole along with various earth slabs investigated by the downhole investigating apparatus for purposes of explaining the theory of the present invention;

FIGURE 8 shows another embodiment of circuitry that could be utilized with the FIGURE 1 apparatus;

FIGURE 9 shows another embodiment of circuitry which could be utilized with the FIGURE 1 apparatus;

FIGURE 10 shows a plot of amplitude versus depth at a selected point in the FIGURE 8 circuitry;

FIGURE 11 shows another embodiment of electrical circuitry that would be utilized with the FIGURE 1 apparatus;

FIGURE 12 shows another embodiment of apparatus for processing well logging measurements in accordance with the present invention; and FIGURE 13 shows the V.G.F. of the FIGURE 12 downhole investigating apparatus at several depth levels in the borehole along with the earth slabs corresponding to these V.G.F.'s.

Figure 1:
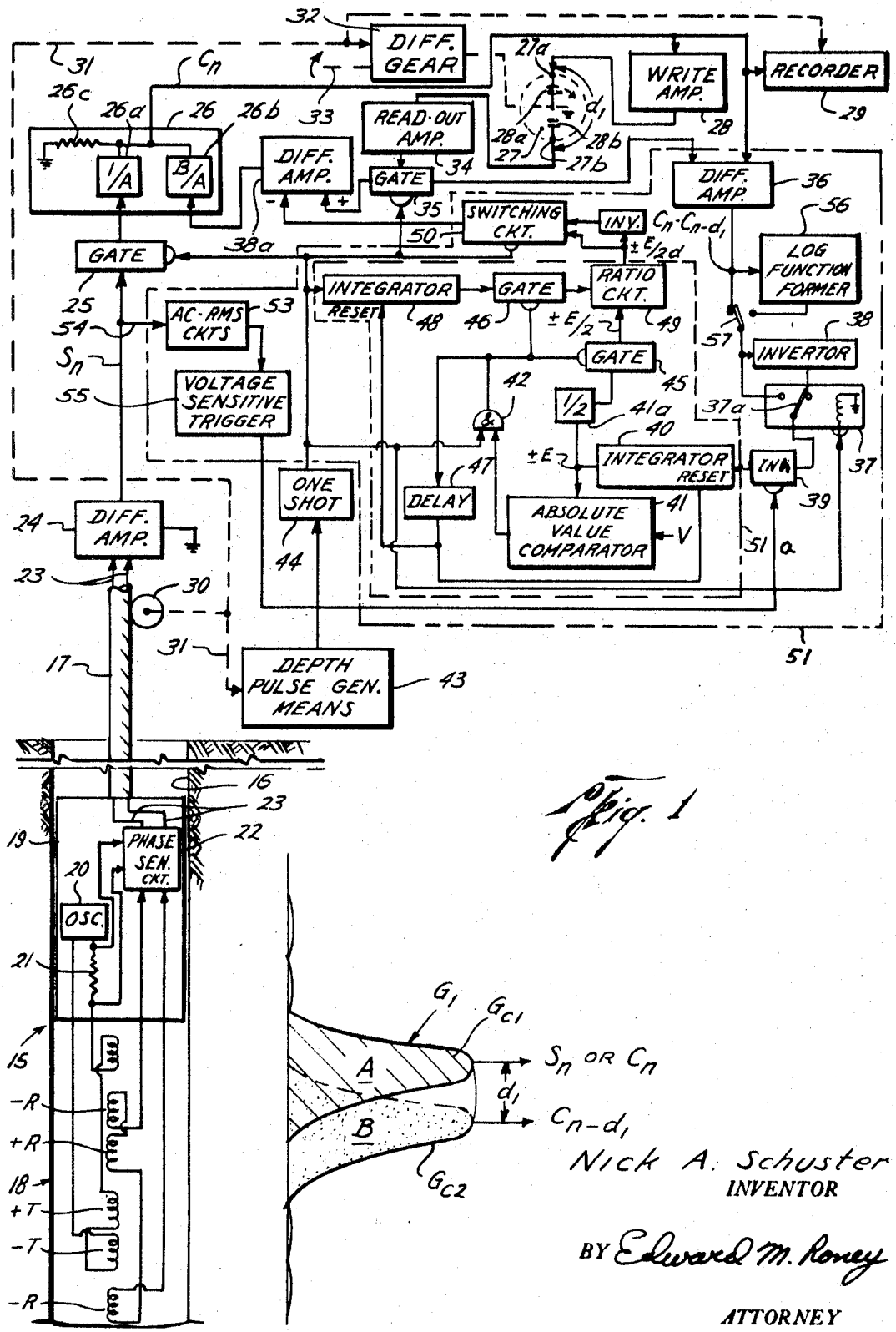
FIGURE 1 shows a downhole investigating apparatus of the induction logging type disposed in a borehole along with a schematic representation of one embodiment of electrical circuitry for processing well logging signals derived from a downhole well logging apparatus in accordance with the present invention.

Referring now to FIGURE 1, there is shown a downhole investigating apparatus 15 supported in a borehole 16 on the end of a cable 17 which is raised and lowered into the borehole by suitable means (not shown). The downhole investigating apparatus 15 includes a coil array 18 suitably wound on a central support member (not shown), the coil array including three transmitter coils and three receiver coils. The minus or plus designations on the coils indicate the polarity with which they are wound. The coil spacings and number of turns can be designed in accordance with standard "induction logging" coil design procedure, and thus need not be discussed in detail here.

The downhole investigating apparatus 15 also includes a suitable fluid-tight electronic cartridge 19, which includes an oscillator 20 which supplies current to the transmitter coils through a suitable low value resistor 21. The receiver coils are wound in a series relationship and the voltage developed across the receiver coils is supplied to suitable phase-selective circuits 22 which derives its phase-reference signals from the resistor 21. It is to be understood that the downhole investigating apparatus 15 could comprise any type of downhole investigating apparatus, such as those well logging devices known as Sonic, Neutron, etc. (In fact, the customary Sonic tool has a V.G.F. very similar to the original apparatus V.G.F. $G_1$ shown in FIGURE 1.)

In operation, the current supplied to the transmitter coils set up a secondary current flow in the adjoining earth formations, which secondary current flow induces a voltage in the receiver coils, which induced voltage is proportional to the secondary current flow and thus proportional to the conductivity of the adjoining earth formations. Shown to the right of the coil array 18 is the V.G.F. $G_1$ of this particular coil array 18. The V.G.F. $G_1$ is broken down into two component parts designated $G_{c1}$ and $G_{c2}$. The V.G.F. portion $G_{c1}$ is shown as the hatched line portion of V.G.F. $G_1$ of area A and the V.G.F. portion $G_{c_2}$ is shown as the dotted portion of V.G.F. $G_1$ of area B. The areas A and B are equal to the total area of V.G.F. $G_1$ and are also equal to each other. The arrow designated $S_n$ or $C_n$ represents the recording point of the V.G.F.'s $G_1$ and $G_{c1}$, the signal designations $S_n$ and $C_n$ representing the signals produced by V.G.F.'s $G_1$ and $G_{c1}$ respectively. The narrow designated $C_{n-d_1}$ represents the recording point of V.G.F. $G_{c2}$, the signal designation $C_{n-d_1}$ representing the signal produced by the component V.G.F. $G_{c2}$.

Before proceeding with the description of the remainder of the FIGURE 1 apparatus, it would be helpful to first discuss what a V.G.F. is. As defined earlier, the V.G.F. is the relative response of the downhole investigating apparatus to a thin conductive bed extending radially to infinity and surrounded by nonconductive beds, as the investigating apparatus passes from $-\infty$ to $+\infty$ across the conductive bed. The resulting curve obtained represents the signal that would be indicated on a meter as the investigating apparatus transgresses the conductive bed. This meter reading plotted versus depth gives the V.G.F. curve. This V.G.F. has a vertical (borehole axis) point which is designated the center or recording point and in this application, the center or recording point for any given V.G.F. will be designated by an arrow with the corresponding signal which that particular V.G.F. produces (e.g. $S_n$, $C_{n-d_1}$, etc.). The V.G.F. has a fixed depth position relative to the downhole investigating apparatus and thus, in effect, moves through the borehole with the investigating apparatus. For normalization, the area under the V.G.F. curve must be equal to "1" (i.e.

$$\int_{-\infty}^{+\infty} X dz = 1 )$$

Another point to be noted about V.G.F.'s is that if a signal is increased or reduced in magnitude, the V.G.F. which produced that signal is also increased or reduced in magnitude by the same proportion. Also, the subscript $n$ refers to the depth level currently under investigation. (Except that, in the derivations, more than one depth level must be considered, and thus "$n+d$," etc. refer to depth levels presently considered. However, in the description of the apparatus, the subscript $n$ will always refer to the depth level presently under investigation.)

The output signal from phase-selective circuits 22 is a varying D.C. signal proportional to the conductivity of the adjoining earth formations and is supplied via a conductor pair 23, which passes through the armored multiconductor cable 17, to the surface of the earth. At the surface of the earth, the conductor pair 23 is supplied to the input of a differential amplifier 24, which supplies the ground reference potential for the surface signal processing equipment. The output signal from differential amplifier 24, designated $S_n$, is supplied through a suitable gate circuit 25 to a weighting function circuit 26a having a weight of $1/A$, of a weighted adding network 26. The output signal $C_n$ from weighted adding network 26, taken across a suitable low value resistor 26c is written into a rotating capacitor memory 27 at a write-in contact 27a through a suitable low output impedance write amplifier 28, and supplied to a suitable recorder 29. The rotating capacitor memory 27 has two capacitors 28a and 28b, one side of which are grounded and the other side opened circuited until the respective capacitors come in contact with the write-in or read-out contacts. The memory 27 could comprise, in addition to the rotating capacitor memory shown in FIGURE 1 any suitable type of memory such as for example the stepping switch operated capacitor memory shown in U.S. Patent No. 3,181,117 granted to W. J. Sloughter on Apr. 27, 1965.

The rotating capacitor memory 27 is rotated in accordance with the movement of the downhole investigating apparatus 15 through the borehole. This movement is detected by a suitable wheel 30 which is disposed relative to the cable 17 so as to rotate with movement thereof. The rotation of the wheel 30 is communicated to a shaft 31 which is supplied through a suitable differential gear 32 to the rotating memory 27. Another shaft 33 which can be rotated by hand is also supplied to the differential gear 32. The shaft 31 is also supplied to the recorder 29 so as to cause the recording medium thereof to move in accordance with depth of the downhole investigating apparatus 15.

Located a clockwise interval $d_1$ from write-in point 27a is a read-out point 27b which supplies the read-out computed signal $C_{n-d_1}$ through a suitable high input impedance read-out amplifier 34 and gate circuit 35 to the negative input of a differential amplifier 36 and the positive input of a differential amplifier 38a. The computed output signal $C_n$ from the weighted adding network 26 is supplied to the positive input of differential amplifier 36. The output signal from differential amplifier 36, which is a difference signal, designated $C_n - C_{n-d_1}$ is supplied directly to one input of a suitable switching circuit 37 via a switch 57, and through an inverter 38 to another input of switching circuit 37. Switching circuit 37 is shown as a suitable two position stepping switch which steps back and forth between the two input contacts. The ouput signal from switching circuit 37 is in the form of alternating positive and negative indications of the difference signal $C_n - _{n-d_1}$ from differential amplifier 36. The output signal from the common switch contact 37a of switch 37, which signal is a varying polarity difference signal, is supplied through a suitable inhibit gate 39 to the input of an integrator 40, which could comprise, for example, an operational amplifier type integrator. The voltage output from integrator 40 is applied to an absolute value comparator 41 to which also is supplied a reference voltage V. Absolute voltage comparator 41 can comprise any standard type of voltage comparator circuit with a suitable full-wave rectifying circuit on the input thereof. In this manner, either positive or negative voltages from integrator 40 will be applied to the voltage comparator circuit of absolute value comparator 41 as a voltage having the same polarity as the reference voltage V. Upon the output voltage $\pm E$ from integrator 40 reaching the absolute value of the reference voltage V, absolute value comparator 41 provides an output signal to an AND gate 42.

To provide the timing pulses for the circuitry of FIGURE 1, the rotating wheel 30 is mechanically coupled via a shaft 31 to a suitable depth pulse generating means 43, which could comprise for example, a standard optical slotted drum which generates pulses at depth intervals $d_1$ apart in response to the movement of the cable 17. These pulses are supplied to a one-shot (monostable multivibrator) which converts the pulses from depth pulse generating means to pulses having a fixed time duration. The output pulses from one-shot 44 are supplied to the control terminals of gates 25 and 35, and switching circuit 37 and to AND gate 42. Each pulse from one-shot 44 causes the switch 37a of switching circuit 37 to switch to the other terminal thereof. The output from AND gate 42 is supplied to the control terminals of gates 45 and 46 and through a suitable delay circuit 47 to the reset inputs of integrators 40 and 48. Since the gates in the FIGURE 1 apparatus are controlled from one-shot 44, it is clear that the signals applied to integrator 40 will be pulses of constant time duration whose magnitudes will be proportional to the desired information. Thus, even though integrator 40 integrates with respect to time, one-shot 44 has removed time as a factor. Additionally, while switching circuit 37 has been shown as a stepping switch for simplicity, it should desirably be an electronic switch so as to not have a mechanical time delay.

The output pulses from one-shot 44 are also supplied to an integrator 48. Since the pulses from one-shot 44 are of fixed time duration and each pulse indicates a depth travel of $d_1$ of the downhole investigating apparatus 15, integrator 48 will develop an analog output voltage proportional to the depth travel of the downhole investigating apparatus 15. This analog output voltage, designated $d$ for depth interval, is supplied through the gate 46, when opened, to a suitable ratio circuit 49 to which also is supplied the output voltage $\pm E/2$ from integrator 40 when gate 45 is open, the ½ being supplied by a suitable voltage dividing network 41a.

The output voltage $\pm E/2d$ from ratio circuit 49 is supplied directly to one input of a switching circuit 50 and through an inverter 51 to the other input of switching circuit 50. The switching circuit 50 is identical, in design to the switching circuit 37 and is also energized by the output pulses from one-shot 44. The output signal from switching circuit 50 is supplied to the minus input of differential amplifier 37, whose output is supplied to a weighting function circuit 26b, having a weight $-B/A$, of weighted adding network 26.

Now concerning the operation of the FIGURE 1 apparatus, the circuitry comprising differential amplifier 24, gate 25, weighted adding network 26, write amplifier 28, memory 27, read-out amplifier 34, and gate 35, is constructed in accordance with the teachings of the above-mentioned copending Schuster application Ser. No. 605,424. The purpose of this signal processing apparatus is to process the derived well logging signals $S_n$ in a manner so as to greatly improve the vertical resolution of the well logging system. In V.G.F. terms, the purpose of this circuitry is to convert the original apparatus V.G.F. $G_1$ to the V.G.F. component $G_{c1}$, which as can be seen in FIGURE 1, has vastly improved vertical resolution. To accomplish this, the V.G.F. component $G_{c2}$ is subtracted from the original apparatus V.G.F. $G_1$ to leave the V.G.F. component $G_{c1}$. The V.G.F. component $G_{c2}$, although subtracted from V.G.F. $G_1$, is shown in an upright position in FIGURE 1 to more clearly show how it subtracts from the V.G.F. $G_1$. The signal $C_n$ corresponding to the computed V.G.F. component $G_{c1}$ is then stored in memory 27 to be subsequently read out and combined with the signal derived an interval $d_1$ later to perform the same function again. Thus, it can be seen that the V.G.F. component $G_{c2}$ in FIGURE 1 corresponding to the read-out computed signal $C_{n-d_1}$ was the computed signal stored in memory 27 an interval $d_1$ earlier (downhole).

In the FIGURE 1 apparatus, this operation is accomplished by supplying the derived signal $S_n$ through gate circuit 25 to weighted adding network 26 where it is combined with the read-out computed signal $C_{n-d_1}$ from read-out contact 27b which is supplied through read-out amplifier 34, gate 35, and differential amplifier 37 to the weighted adding network 26. The resulting computed signal $C_n$ along with being supplied to recorder 29 for recordation as a function of depth, is written into memory 27, from which it is read-out an interval $d_1$ later for combination with the new derived signal.

Looking now at FIGURE 2, there is shown a plurality of earth formation slabs having conductivities $\sigma_{n+2d_1}$, $\sigma_{n+d_1}$, $\sigma_n$, and $\sigma_{n-d_1}$, looking from top to bottom. Shown opposite these earth formation slabs is the original apparatus V.G.F. $G_1$ (shown in rectangular form for simplicity) in a plurality of depth positions. The V.G.F.'s $G_2$, $G_3$, $G_4$ and $G_5$ represent the V.G.F. $G_1$ in the plurality of positions. The V.G.F. $G_2$ corresponding to the derived signal $S_n$ is opposite the earth slabs having conductivities $\sigma_n$ and $\sigma_{n-d_1}$, the portion of V.G.F. $G_2$ of area A being opposite the earth formation slab having conductivity $\sigma_n$ and the V.G.F. portion of area B being opposite the slab having conductivity $\sigma_{n-d_1}$. The relationship for the derived signal $S_n$ of FIGURE 2 can be written as:

$$S_n = A\sigma_n + B\sigma_{n-d_1} \qquad (1)$$

Now remembering that the computed output signal from weighted adding network 26 in FIGURE 1 corresponds to the V.G.F. component $G_{c1}$, it can be seen that the computed value $C_n$ can be substituted for the conductivity value $\sigma_n$. Likewise, since the read-out computed signal $C_{n-d_1}$ corresponds to the V.G.F. component $G_{c2}$, this read-out computed signal $C_{n-d_1}$ can be substituted for the conductivity value $\sigma_{n-d_1}$. Thus Equation 1 takes the form:

$$S_n = AC_n + BC_{n-d_1} \qquad (2)$$

Now solving Equation 2 for the computed value $C_n$:

$$C_n = \frac{1}{A}S_n - \frac{B}{A}C_{n-d_1} \qquad (3)$$

It can be seen that the weights $1/A$ and $-B/A$ in Equation 3 coincide with the weighting factors of weighting function circuits 26a and 26b in FIGURE 1.

It was shown in the copending Schuster application Ser. No. 605,424 that if an error crept into the signal processing system, it would be eliminated as the investigating apparatus moves away from the depth level at which the error occurred, provided that the V.G.F. area B is different from the V.G.F. area A. However, this automatic error elimination will not occur if the V.G.F. areas A and B are substantially the same.

Now, if the V.G.F. areas A and B are equal, then $A = B = \frac{1}{2}$, since $A+B$ must equal 1 for normalization. Now substituting these values into Equation (3):

$$C_n = 2S_n - 1C_{n-d_1} \qquad (4)$$

(It is to be noted that the V.G.F.'s shown in FIGURES 1 and 2 are not shown normalized as far as the computed V.G.F.'s are concerned. Thus, assuming that the V.G.F. $G_2$ in FIGURE 2 is shown normalized, i.e. $A+B=1$, the weighted adding network 26, in effect, multiplies this V.G.F. $G_2$ by a factor of 2 such that the computed V.G.F. corresponding to the V.G.F. component $G_{c1}$ will be normalized to 1 and therefore the V.G.F. component $G_{c2}$ corresponding to the read-out computed signal is also normalized to 1.)

Now combining Equations 1 and 4, including the numerical values for A and B:

$$C_n = \sigma_n + \sigma_{n-d_1} - \sigma_{n-d_1} = \sigma_n \qquad (5)$$

However, assume that the read-out computed signal $C_{n-d_1}$ is not exactly equal to $\sigma_{n-d_1}$, but instead is equal to:

$$C_{n-d_1} = \sigma_{n-d_1} + e \qquad (6)$$

where $e$ is an error component of $C_{n-d_1}$. This error component $e$ can be caused by such things as slight inaccuracies in the signal processing circuitry (i.e. weighted add-in network 26 or write and read-out amplifiers), transients induced into the derived or computed signals, borehole size changes, certain formation boundary or invaded zone conditions, etc.

Now, combining equations 1, 4, and 6:

$$C_n = 2S_n - \sigma_{n-d_1} - e = \sigma_n - e \qquad (7)$$

Now when the investigating apparatus 15 has moved upward an interval $d_1$ to the depth level corresponding to the V.G.F. $G_3$ in FIGURE 2, the relationship for the computed signal $C_{n+d_1}$ will be:

$$C_{n+d_1} = 2S_{n+d_1} - C_n = \sigma_{n+d_1} + e \qquad (8)$$

In like fashion, when the investigating apparatus 15 has moved upward another interval $d_1$ to the depth level corresponding to the V.G.F. $G_4$ in FIGURE 2, the relationship for the computed signal $C_{n+2d_1}$ will be:

$$C_{n+2d_1} = 2S_{n+2d_1} - C_{n+d_1} = \sigma_{n+2d_1} - e \qquad (9)$$

It can be seen that from Equations 6, 7, 8 and 9 for the computed signals $C_{n-d_1}$, $C_n$, $C_{n+d_1}$, and $C_{n+2d_1}$, that the error $e$ alternates between positive and negative after each depth interval $d_1$, i.e., $+e$, $-e$, $+e$, $-e$, etc. This relationship can be utilized to determine the magnitude of the error and correct it.

Returning now to FIGURE 1, the circuitry within the box 51 comprises means for detecting the error $e$, computing the magnitude and relative polarity of the error, and generating an error correction signal for correcting the error. The read-out computed signal $C_{n-d_1}$ is subtracted from the new computed signal $C_n$ in differential amplifier 36 and the resulting difference signal $C_n-C_{n-d_1}$ is reversed in polarity each depth interval of $d_1$ by the switching circuit 37 and inverter 38. The circuitry within the dotted line box 51a includes the logic circuitry for determining if an error is present in the computed signals along with the circuitry for computing the error and generating the necessary error correction signal to the negative input of differential amplifier 38a. This causes the correction of the readout computed signal $C_{n-d_1}$ and thus stops the propagation of the error $e$ through the computed signals as the downhole investigating apparatus 15 transgresses the adjoining earth formations. The switching circuit 50 insures that the error correction signal is combined with the read-out computed signal $C_{n-d_1}$ in the proper polarity.

From Equations 6 and 7, the relationship for the output signal from differential amplifier 36 can be written as:

$$C_n - C_{n-d_1} = \sigma_n - e - \sigma_{n-d_1} - e \quad (10)$$

Now considering the computed signals an interval $d_1$ later, combining Equations 7 and 8:

$$C_{n+d_1} - C_n = \sigma_{n+d_1} + e - \sigma_n + e \quad (11)$$

From Equations 10 and 11 it can be seen that if the conductivity values $\sigma_n$ and $\sigma_{n-d_1}$ in Equation 10 are the same, then $C_n - C_{n-d_1}$ will be equal to $-2e$. In like fashion, in Equation 11, if the conductivity values $\sigma_{n+d_1}$ and $\sigma_n$ are equal, then the output signal from differential amplifier 36, at this point in time, will be equal to $+2e$. Now, assuming these conductivity values to be equal, it can be seen that each output signal from switching circuit 37 will have an absolute error magnitude of $|2e|$ and will be of the same polarity. However, this is dependent on the fact that the conductivity values are equal from one earth formation to the next. Obviously, this will seldom be the case. However, if a sufficient interval of the earth formations are considered, then it is clear that there is a strong probability that the conductivity component of the difference signal $C_n - C_{n-d_1}$ from differential amplifier 36 will be substantially zero. Additionally, for any appreciable conductivity components to be supplied to the integrator 40 from switching circuit 37 over a long interval of the earth formations, the conductivity of the adjoining earth formations would have to be of an oscillatory nature since switching circuit 37 is sequentially inverting the polarity of the difference signals $C_n - C_{n-d_1}$. The probability of the earth formation conductivity having an oscillatory nature is substantially small. It is this theory of probability that enables the error correction circuit 51 to accurately determine if there is, in fact, an error propagating through the computed values of conductivity from weighted adding network 26, since after a sufficient depth interval of the formations is considered, there is a strong probability that the conductivity values have cancelled out and only the error component $e$ remains.

The integrator 40 sums up the varying polarity difference signals from switching circuit 37 as a function of depth (not time). The absolute value comparator 41 generates an output signal to AND gate 42 upon the output voltage of integrator 40 attaining the absolute value of the reference voltage V. This reference voltage V is high enough that the theory of probability discussed above is satisfied. To insure that the error correction signal output from error circuit 51 coincides with the read-out computed signal $C_{n-d_1}$ from memory 27 through gate 35, the one-shot 44 which controls gate 35, also controls gates 45 and 46 through AND gate 42. Thus, before an error correction signal can be supplied to differential amplifier 38a, there must be a coincidence of an output signal from absolute value comparator 41 and the pulse from one-shot 44. Since the signal supplied to integrator 40, considering the error component only, is equal to $\pm 2e$, the voltage on the output of integrator 40 will be proportional to $d.2e$ where $d$ is the integration interval (i.e., the number of pulses from one-shot 44 times the depth interval $d_1$ between pulses). The voltage dividing network 41a reduces this relationship to $\pm d.e$ and the depth signal $d$ from integrator 48 reduces the relationship to $\pm e$. After the error correction signal has been generated from error circuit 51, the output signal from AND gate 42, after a suitable delay by delay circuit 47 resets integrators 40 and 48 to begin the operation again. Switching circuit 38 insures that the error correction signal is combined with the read-out computed signal $C_{n-d_1}$ in the proper polarity to cancel out the error $e$.

Figure 3:
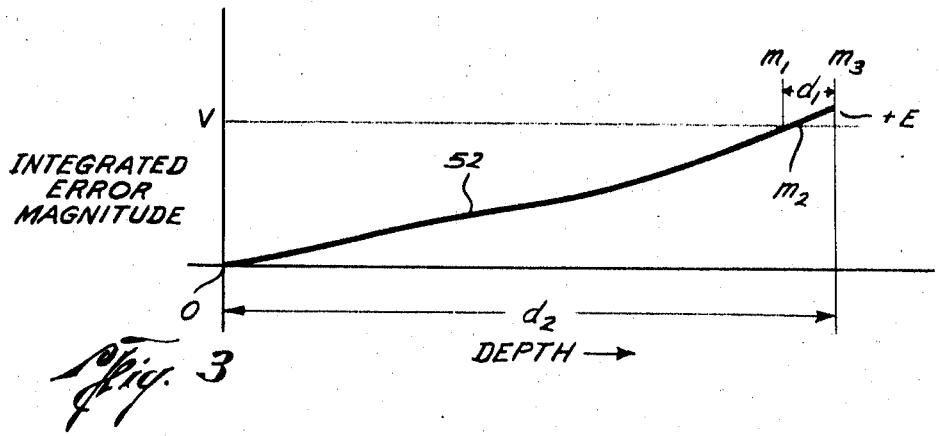
FIGURE 3 shows a plot of amplitude versus depth at a selected point in the FIGURE 1 circuit.

Now referring to FIGURE 3, there is shown a plot of the integrated error magnitude, i.e. the output voltage of integrator 40, versus depth. Looking at the solid line plot 52, it can be seen that the integrated error magnitude is increasing in the FIGURE 3 plot as a function of depth. (Note—the plot 52, as well as a remainder of the "integrated error magnitude" curves are shown as smooth lines for simplicity. In actuality, since the derived signals are being sampled in discrete steps, the "integrated error magnitude" curves will really take on a stepping or staircase shape.) At the depth measure level $m_2$, the integrated error magnitude reaches the threshold value V of the comparator circuit 41. The depth measure level $m_1$ represents a depth level at which a pulse from one-shot 44 is generated. A depth interval $d_1$ later at depth measure level $m_3$, a pulse from one-shot 44 is generated and at this depth level, an error correction signal is generated from the error circuit 51. The integration depth interval is designated $d_2$ in FIGURE 3. Thus, in the FIGURE 3 case, the error correction signal will be equal to $+E/2d_2$, to correct the error $e$ in the read-out computed signal $C_{n-d_1}$. This insures, then, that the new computed signal $C_n$ will be accurate (provided no error is present in the new derived signal $S_n$), and thus the computed signals $C_{n+d_1}$, $C_{n+2d_1}$, etc. will be accurate until a new error shows up in the computed signals.

If desired, the differential amplifier 36 could be omitted from the FIGURE 1 apparatus, and only the computed signals $C_n$ supplied to switching circuit 37 and inverter 38. In this event, the signals supplied to integrator 40 will be reversed in polarity from one earth slab to the next, and the error component will be $\pm e$ instead of $\pm 2e$. However, the output voltage from integrator 40 will be fluctuating to a great extent since the conductivity components of each signal applied to integrator 40 will not be substantially cancelled out. Thus, by using the differential amplifier, 36, the conductivity components will be cancelled out for each signal applied to integrator 40 and the error component of each signal will be twice as large, thus providing more desirable results.

It may be desirable to use the signal processing apparatus of FIGURE 1 for investigating earth formations surrounding a borehole wherein there are regions of the adjoining earth formations which have widely varying values of conductivity. It can be seen that when investigating such earth formation regions, the difference signal $$C_n - C_{n-d_1}$$

from differential amplifier 36 may have large voltage components which are representative of only differences in conductivity and not errors. In this event, the voltage output of integrator 40 may exceed the threshold voltage V after a relatively short integration interval even though no error is present in the computed signals, i.e., the theory of probability discussed earlier will be diluted.

To take care of this problem, a suitable AC coupled RMS circuit 53 (or differentiator, if desired) is switched to the output of differential amplifier 24 by a suitable single-throw switch 54 so as to provide an indication of the activity level of the signals derived from the downhole investigating apparatus 15. When the signals derived from the downhole investigating apparatus 15 begin fluctuating to a great extent, the output voltage from the AC–RMS circuit 53 increases. When this output voltage from circuit 53 increases to a high enough level, a suitable voltage sensitive trigger 55, which could comprise for example, a Schmitt trigger, supplies an output signal to inhibit gate 39 so as to inhibit the signals from switching circuit 37 from being applied to integrator 40. After the investigating apparatus 15 has passed the earth formation zone having such highly fluctuating values of conductivity, the output voltage from circuit 53 drops below the threshold value of trigger 55, thus de-energizing inhibit gate 39 and enabling the output signals from switching circuit 37 to again be applied to integrator 40. Although it is not shown, it can be appreciated that it may be desirable to reset the integrators 40 and 48 whenever the highly fluctuating zones are transgressed. To accomplish this, the output from voltage sensitive trigger 55 would be applied to the reset connections of integrators 40 and 48.

Another alternative embodiment for use when the downhole investigating apparatus 15 enters regions of widely fluctuating conductivity, is for the error circuit 51 to give less weight to the difference signals $C_n - C_{n-d_1}$ from differential amplifier 36 when the downhole investigating apparatus 15 is investigating such regions. In the FIGURE 1 apparatus, this alternative embodiment is shown by switching the switch 57 to the position to supply the difference signals $C_n - C_{n-d_1}$ from differential amplifier 36 through a suitable non-linear circuit, such as the logarithmci function former 56, the output from logarithmic function former 56 being supplied to te switching circuit 37 and inverter 38 through the double-throw switch 57. By so doing, those difference signals from differential amplifier 36 with large magnitudes will be de-emphasized.

It may be desirable, in connection with the FIGURE 1 apparatus, to use other logic for detecting in presence of an error than that shown in FIGURE 1. It may be desirable to correct the read-out computed signal $C_{n-d_1}$ only after a given depth interval has been considered, provided the output voltage from integrator 40 has attained the threshold level V, or it may be desirable to reset integrators 40 and 48 if an error has not been detected after a given interval.

Figure 4:
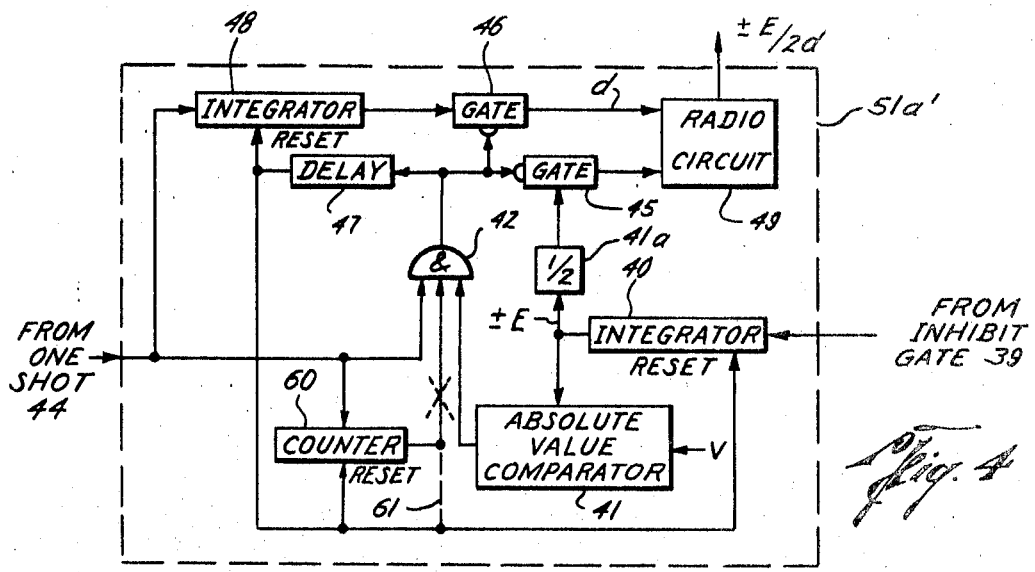
FIGURE 4 shows an alternative circuit arrangement that could be substituted for a portion of the FIGURE 1 apparatus.

Looking at FIGURE 4, there are shown alternative embodiments of the circuit 51a of FIGURE 1 for performing these alternative functions. The circuitry of FIGURE 4, shown within the dotted line box 51a', can be substituted for the circuitry enclosed by the dash line box 51a in FIGURE 1. In the FIGURE 4 circuit, the same circuit elements shown in FIGURE 1 are also shown in FIGURE 4 with the same numerical designations and thus, need not be discussed further. Likewise, the external connections to the circuit 51a' of FIGURE 4 are identical with those in FIGURE 1 and thus, need not be discussed further.

In addition to the circuitry of the FIGURE 1 circuit 51a, a suitable counter 60, such as for example, a ring counter, is disposed within the circuit 51a so as to count the pulses from one-shot 44 and after a desired count, supply a pulse to the AND gate 42. Since the output from AND gate 42 initiates the error correction operation, it can be seen that this error correction operation will not take place until the downhole investigating apparatus 15 has transgressed a desired depth interval, and then only if the integrated error magnitude from integrator 40 has reached the threshold value V. This causes the integrator 40 to integrate over a sufficient depth interval so as to insure that the theory of probability discussed earlier will be justified. That is, the longer the interval of integration, the better will be the probability that the earth formations do not have oscillating positive and negative regions of conductivity, and if there is no error in the computed values, the better will be the probability that the sum of the voltages applied to integrator 40 over this long interval will be substantially zero. The output signal from AND gate 42 also resets counter 60 through delay circuit 47, along with resetting integrators 40 and 48.

It may also be desirable to reset the integrators if the total integrated value on the output of integrator 40 has not reached a certain specified threshold value within a given depth interval. The reason for using this technique may be that, after a depth interval of sufficient length, if the integrator 40 does not provide a sufficient output voltage, it may be assumed that if there is any voltage on the output of integrator 40 below a certain level, the probability may be greater than this voltage is, in fact, a voltage level which may ordinarily be obtained even if there is no error present in the computed signals. Additionally, it may be assumed that this voltage on the output of integrator 40, if below a specified value, even if it is a genuine error, it is not an error which will have any substantial adverse effects on the computed log recorded by recorder 29 of FIGURE 1. The circuitry for accomplishing this latter function is represented in FIGURE 4 by the dotted line 61 connecting the output of counter 60 to the reset inputs of integrators 40 and 48, and counter 60, along with the X-ed out line from ring counter 60 to AND gate 42. Thus in operation, this alternative embodiment in FIGURE 4 will cause the reset of integrators 40 and 48 after a given depth interval if a correction has not been performed by this time. On the other hand, if the output from integrator 40 reaches the threshold value V before this given depth interval, a correction will take place by generating the error correction signal $\pm E/2d$ from ratio circuit 49 in the manner discussed in connection with FIGURE 1.

It will be obvious to one skilled in the art that various alternatives could be used with the FIGURE 4 circuit. For example, the X-ed out line could be left connected so that the error correction signal would be generated only after the given depth interval, provided the integrated value from integrator 40 exceeds the threshold level V, and if not, integrators 40 and 48 and counter 60 would be reset. Additionally, the counter 60, after a given count or interval, could cause the integrators 40 and 48 and counter 60 to be reset if the integrated value of integrator 40 does not exceed a first lower threshold value, and if it is exceeded, to continue counting to a second interval at which time the error correction signal is generated if it excceeds a second higher threshold level.

Figure 5:
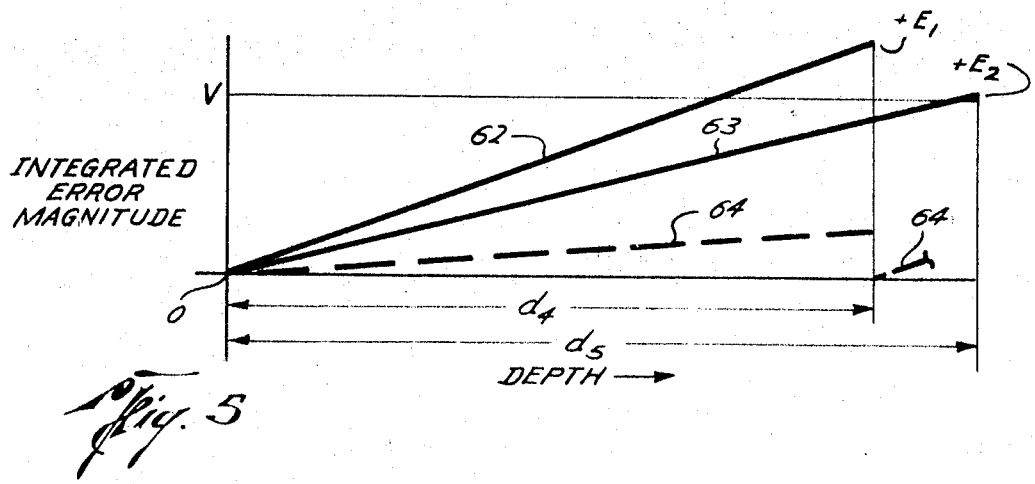
FIGURE 5 shows a plot of amplitude versus depth at a selected point in the FIGURE 4 circuitry.

Referring now to FIGURE 5, there is shown a plot of the integrated error magnitude versus depth for the FIGURE 4 apparatus. In the FIGURE 5 plot, the depth interval $d_4$ is considered to be the depth count of counter 60. First, considering the primary (solid line) embodiment of FIGURE 4, the plot 62 shows the case where the integrated error magnitude exceeds the threshold value V before the counter 60 has supplied an output signal to AND gate 42. Thus, the integrated error magnitude continues increasing until counter 60 supplies an output signal after a depth interval $d_4$. Thus, in this case, the output signal from ratio circuit 49 will be $+E_1/2d_4$. The plot 63 shows the case where the counter 60 has supplied an output signal to AND gate 42 before the integrated error magnitude has reached the threshold value V. In this case, the error correction output signal from ratio circuit 49 will be $+E_2/2d_5$. Now concerning the alternative embodiment of the FIGURE 4 apparatus (dotted line in FIGURE 4), from the dotted line plot 64 in FIGURE 5, it can be seen that the integrated error magnitude has not reached the threshold level V by the depth interval $d_4$ corresponding to the count of counter 60, and thus the integrator 40 is reset to zero and the integration process started over again.

Figure 6:
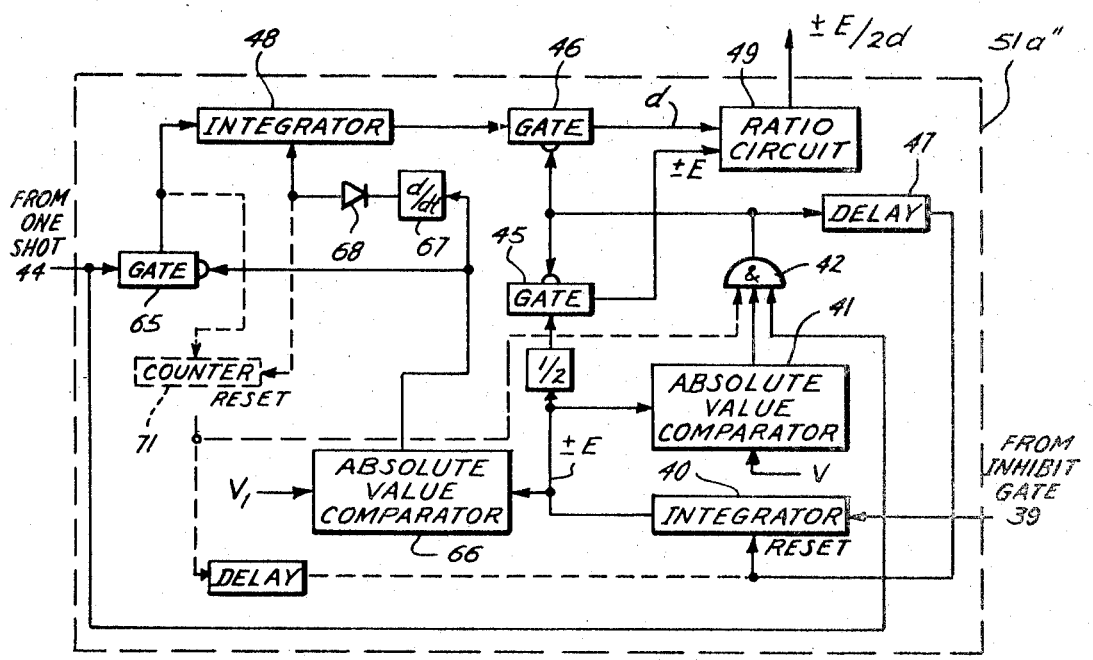
FIGURE 6 shows another embodiment of circuitry that could be substituted for a portion of the FIGURE 1 apparatus.

Looking now at FIGURE 6, there is shown a circuit 51a'' that can be utilized in place of the error logic circuit 51a of FIGURE 1. In the FIGURE 6 circuit, the circuit elements having the same designations as certain circuit elements in FIGURE 1, and the external connections are the same as in FIGURE 1 and need not be discussed.

Concerning the differences in FIGURE 6, the pulses from one-shot 44 are supplied to the depth integrator 48 through a gate circuit 65. In addition, the integrated value from integrator 40 is supplied to a second absolute value comparator 66 whose reference voltage is $V_1$. The output from absolute value comparator 66 is supplied to the control terminal of gate 65 and to the reset input of integrator 48 through a suitable differentiating circuit 67 and a back-biased diode 68.

In operation, the reference value $V_1$ applied to absolute value comparator 66 has a magnitude much less than the reference value V applied to absolute value comparator 41, thus enabling absolute value comparator 66 to act as an approximate zero crossing detector. When the output of integrator 40 exceeds the reference value $V_1$, absolute value comparator 66 supplies a positive output voltage of a continuing nature to gate 65 enabling the pulses from one-shot 44 to be counted by integrator 48 to provide a depth function. This insures that integrator 48 will not begin integrating depth pulses until it is reasonably certain that an error is in fact present in the computed signals $C_n$. In the event that the integrated value from integrator 40 drops below the reference value $V_1$ before the presence of an error is detected, the voltage output from absolute value comparator 66 will drop to zero, thus causing a negative going pulse to be applied through diode 68 to the reset input of integrator 48.

Figure 7:
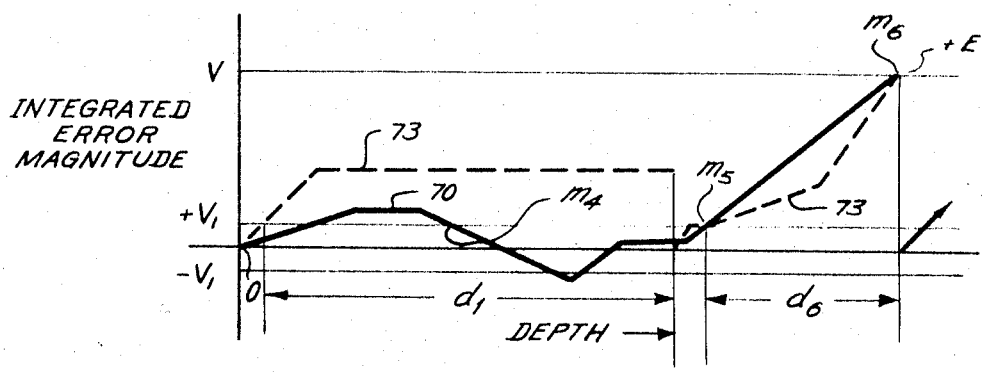
FIGURE 7 shows a plot of amplitude versus depth at a selected point in the FIGURE 6 circuitry.

Looking now at FIGURE 7, there is shown a plot of the integrated error magnitude versus depth for the FIGURE 6 circuitry. Looking at the solid line plot 70 in FIGURE 7, it can be seen that the integrated error magnitude exceeds the threshold level $V_1$ for a short depth interval and then drops below this reference value $V_1$ at measure point $m_4$. Since the integrated error magnitude does not attain the threshold level V of absolute value comparator 41, no error correction operation has taken place yet. Following the plot 70, it can be seen that the integrated error magnitude exceeds the threshold level $-V_1$ for a short interval and eventually cross the threshold level $+V_1$ at depth measure level $m_5$ and increases in magnitude until reaching the threshold level V of comparator 41 at depth measure level $m_6$. Thus, when the next pulse from one-shot 44 is applied to AND gate 42, an error correction signal equal to $+E/2d_6$, where $d_6$ is the depth interval between depth levels $m_5$ and $m_6$, is generated from ratio circuit 49 to correct the read-out computed signal $C_{n-d_1}$ from memory 27 in FIGURE 1. Thus, it can be seen that with the FIGURE 6 error detection circuit, during depth intervals where no apparent error is detected, the depth integrator 48 will be non-responsive to the depth pulses from one-shot 44. This operation, in effect, changes the reference depth level for the depth signal $d$ supplied from integrator 48 of FIGURE 1 so that the depth signal $d$ will have a value to more nearly coincide with the depth interval for which the error was present in the computed signals.

Another alternative arrangement of the FIGURE 6 circuitry is represented by the dotted lines in FIGURE 6. In this alternative arrangement, the output of gate 65 is applied to a counter 71, which after reaching a desired count, causes a signal to be applied to AND gate 42, and causes the reset of integrator 40. When integrator 40 is reset, the output of comparator 66 drops to zero, thus causing the reset of integrator 48 and counter 71.

Looking again at FIGURE 7, the dotted line plot 73 shows the operation of this alternative arrangement of the FIGURE 6 error detection circuit. Assuming that the depth interval which counter 71 counts to, before generating an output pulse is the depth interval $d_7$ in FIGURE 7, it can be seen that the integrated error magnitude has not reached the threshold value V after this count $d_7$, and thus the integration operation is reset to begin again. Now following this plot 73, it can be seen that at the depth measure level $m_5$, the integrated error magnitude exceeds the threshold level $V_1$ of comparator 66, thus causing integrator 48 to begin integrating the depth pulses from one-shot 44 and for counter 71 to begin counting for the depth interval $d_6$. However, since the plot 73 reaches the threshold level V of comparator 41 before this count $d_7$, an error correction signal equal to $+E/2d_6$ is generated from ratio circuit 49 in the same manner as above.

In the preceding embodiments, the error correction operation has only corrected the read-out computed signal $C_{n-d_1}$ to inhibit the propagation of the error through the remainder of the computed signals, but has not been concerned with correcting any of the previously computed signals which have already been recorded. However, if the previously computed signals are not to be corrected, then it will more than likely be desirable to set the threshold level of comparator 41 relatively low (or alternatively to set the integration interval relatively low) so that the previously computed signals placed in recorder 29 will not have reached very large errors. On the other hand, it may be desirable to set the threshold value for the integrated error magnitude (or the integration interval) at a relatively large level so that the theory of probability discussed above, will be justified to a greater extent.

Looking now at FIGURE 8, there is shown apparatus for correcting the previously computed signals before they are applied to the recorder. In FIGURE 8, the circutry of FIGURE 1 for computing $C_n$ is omitted for brevity, but is considered to be part of the FIGURE 8 apparatus. The error detection and correction circuit 51 is the same as the error circuit 51 of FIGURE 1, but utilizing the FIGURE 6 alternative embodiment (dotted lines of FIGURE 6 are included) as the circuitry within the dotted line box 51a to provide a constant integration interval. The computed signal $C_n$ from weighted adding network 26 and write amplifier 28 of FIGURE 1 is written into a suitable rotating capacitor memory 75 at a write-in point 75a. Rotating capacitor memory 75 is essentially the same in construction as rotating capacitor memory 27 of FIGURE 1 with the exception that rotating capacitor memory 75 has a large number of capacitors (not shown) located at depth intervals $d_1$ apart. Located a depth interval $d_1$ from write-in point 75a is a read-out point 75b which supplies the read-out computed signal $C_{n-d_1}$ to the read-out amplifier 34 of FIGURE 1. This depth interval $d_1$ in FIGURE 8 is the same as the depth interval $d_1$ shown with memory 27 in FIGURE 1. Thus, memory 75 is substituted for memory 27 in FIGURE 1.

The output signal from gate circuit 35 of FIGURE 1 is supplied to the differential amplifier 36 within error circuit 51 of FIGURE 1. The output from AND gate 42 of the error detection circuit 51 of FIGURE 1, along with being supplied to gates 45, 46 and delay 47 of FIGURE 6, is supplied to the "set" input of a flip-flop 76. The "1" output from flip-flop 76 is supplied to the control terminals of a pair of gates 77 and 78. The input to gate 78 is supplied from the one-shot 44, the output from gate 78 being supplied to the input of a counter 79, which counts the pulses from one-shot 44 and after a desired count, supplies a pulse to the reset input of flip-flop 76. The output from switching circuit 50 of error circuit 51 is supplied to the differential amplifier 38a of FIGURE 1.

The error correction signal from the ratio circuit 49 (FIGURE 1) of error circuit 51 is supplied to a suitable memory device 80. The memory device 80 stores the error correction signal $\pm E/2d$ from error circuit 51 until a reset pulse is applied from counter 79. The memory 80 could comprise, for example, a shunt capacitor fed from a forward-biased diode, the reset operation of memory 80 taking the form of a switch across the capacitor which causes the capacitor to discharge upon a signal being applied to the reset input of memory 80. The output of memory 80 is applied to a switching circuit 81 like switching circuit 37 in FIGURE 1 and an inverter 82a, the output from inverter 82a being applied to the other input of switching circuit 81. Switching circuit 81 is driven by one-shot 44. The output from switching circuit 81 is applied through the gate 77 to a differential amplifier 82, the other input to differential amplifier 82 being supplied from a read-out amplifier 83 whose input is connected to a read-out contact 75c of memory 75. The input impedance to differential amplifier 82 must be sufficiently high so as to preserve the charge on the capacitor of memory 80 for multiple read-out.

Concerning the operation of the FIGURE 8 apparatus, upon an error correction signal being generated from ratio circuit 49 of error circuit 51, this error correction signal $\pm E/2d$ is memorized by memory 80. This error correction signal is gated out to differential amplifier 82 by gate 77 at depth intervals of $d_1$ apart and in the proper polarity as determined by switching circuit 81. These error correction signals are combined with the signals read out from memory 75 at read-out point 75c in differential amplifier 82. The depth interval $d_8$ between read-out points 75b and 75c of memory 75 and is equal to the depth interval count of counter 71 of FIGURE 6. This depth interval $d_8$ is also the depth interval count of counter 79.

When the error correction signal is generated from error circuit 51 and the set input of flip-flop 76 is energized, the computed signal read-out of memory 75 at read-out point 75c, at this time, is the computed signal corresponding to the first depth level at which gate 65 of FIGURE 6 was energized in producing the present error correction signal. Thus, it can be seen that the computed values in memory 75, which were previously computed, are corrected in FIGURE 8 by supplying the error correction signal stored in memory 80 to differential amplifier 82 each time a pulse is generated from one-shot 44, provided an error has been detected. The read-out computed signal $C_{n-d_1}$ from read-out point 75b of memory 75 is corrected in the same manner as discussed earlier, in the FIGURE 8 apparatus. Thus, after all of the necessary computed signals stored in memory 75 have been corrected, counter 79 generates a pulse to reset memory 80 and flip-flop 76, thus deenergizing gates 77 and 78 and resetting the counter 79 until a new error is detected.

While, in the FIGURE 8 apparatus, the integration interval was fixed by counter 71 of FIGURE 6 so that the interval between read-out points 75b and 75c of FIGURE 8 could be set at $d_8$, it can be appreciated that apparatus could be constructed to allow the integration interval to vary and still correct the previously computed signals. For example, standard digital techniques could be utilized for this purpose.

It may also be desirable in connection with the present invention to utilize two error circuits in place of one wherein one error circuit is utilized to correct the read-out computed signal $C_{n-d_1}$ which is supplied to weighted adding network 26 of FIGURE 1, and the other error circuit is used to correct the computed values stored in the memory 75. In this event, the integration interval (or threshold) of the error circuit which causes the correction of the computed values stored in memory 75 could be set relatively short (or low) so that the length of memory 75 could be relatively small. The integration interval of the error circuit which corrects the read-out computed signal $C_{n-d_1}$ supplied to weighted adding network 26 of FIGURE 1 could then be set relatively long (either by setting the integration interval itself long or by setting the threshold level V relatively high) so that the theory of probabilities discussed above will more likely be justified. In FIGURE 8, the apparatus for accomplishing this is represented by the dotted line 85 supplying the output signal from gate 35 (FIGURE 1) to a second error detection and correction circuit 51' and a dotted line 85a supplying the pulses from one-shot 44 to this second error detection circuit 51'. The error correction signal to differential amplifier 38a from error circuit 51 is shown X-ed out for this alternative embodiment while the error correction signal applied to differential amplifier 38a is derived from the second error detection circuit 51'.

It is to be understood that there could be many refinements in logic utilized in the present invention to achieve the desired results. For example, circuitry could be utilized for enabling the error circuit to examine a first depth integration interval and determine if error correction is necessary, but not generate an error correction signal until the error circuit has had an opportunity to examine a second depth integration interval to determine if the error still exists. If the error exists in these two consecutive depth intervals, the computed signals corresponding to the first depth interval can then be corrected. In this manner, if the downhole investigating apparatus 15 is investigating a zone having violently fluctuating values of conductivity, thus increasing the probability that the error circuit will indicate an error where none exists, the error circuit, by examining a second interval, is not fooled by any erroneous errors indicated during the first interval. Desirably, each interval of integration should be at least as great as the expected depth intervals of such regions of violently fluctuating conductivities.

Looking now at FIGURE 9, there is shown apparatus for performing the above operation that can be utilized in connection with a portion of the FIGURE 1 apparatus. Again, in FIGURE 9, that portion of the FIGURE 1 apparatus which performs the same function has been omitted. More specifically, the circuit 51b of FIGURE 9 can be substituted for the error logic circuit 51a of FIGURE 1 and memory 75 is substituted for memory 27 of FIGURE 1. Read-out amplifier 83, inverter 101, switching circuit 102, and differential amplifier 82 of FIGURE 9 comprise circuitry added to FIGURE 9 for correcting the previously computed signals stored in memory 75.

In the FIGURE 9 apparatus, the integrator 40 provides the integrated error magnitude $\pm E$, and after a given count by counter 87, supplies this integrated error magnitude $\pm E$ through the gate circuit 88, which is energized by counter 87, to a ratio circuit 89. The depth function $d/2$ is also supplied to ratio circuit 89, where $d$ is the depth interval corresponding to the count of counter 87. The output signal $\pm E/2d$ from ratio circuit 89 is compared with a reference value V in an absolute value comparator 90 and if $\pm E/2d$ is greater than V, the error correction signal $\pm E/2d$ is supplied to one of the memories 91 or 92, as determined by switching circuit 93. The purpose of flip-flop 94, trigger flip-flop 95, AND gates 96 and 97, differentiator 103, and gates 98 and 99 is to supply the proper error correction signal from one of memories 91 or 92 through the OR gate 100, switching circuit 102, and inverter 101 to the differential amplifier 82 upon an error being detected in two successive integration intervals. That is, the logic circuitry comprising differentiator 103, flip-flop 94, trigger flip-flop 95 and AND gates 96 and 97 determines if the presently investigated interval (the interval as determined by counter 87) and the preceding investigated interval have produced error correction signals which exceed the threshold level V, and if so, to correct the computed signals read out of memory 75 from read-out contact 75c. Trigger flip-flop 95 keeps track of which integration interval is the one being presently investigated and which one was previously considered, i.e., which memory, 91 or 92, contains the error correction signal from the preceding integration interval. Flip-flop 94 supplies a signal to AND gates 96 and 97 if an error has been detected by comparator 90, in which case, one of the gates 98 or 99 is opened to allow the error correction signal stored in either memory 91 or 92 (whichever one represents the last preceding integration interval, not the one just considered) to be utilized to correct the computed signals from memory 75 in differential amplifier 82. The flip-flop 94 is reset by the output pulse from counter 87 only if an error is not detected (Note: the output signal from comparator 90 is of longer duration than the reset pulse from differentiator 103).

Taking an example of this, assume an error correction signal is stored in memory 91 for the first integration interval. If an error is detected in the second integration interval, AND gate 96 will become energized from the "0" output of trigger flip-flop 95, the "1" output of flip-flop 94, and one-shot 44. Thus, during the third integration interval, memory 91 will produce error correction signals to correct the computed signals read out from memory 75 each time one-shot 44 generates a pulse. The error correction signal for the second integration interval will be stored in memory 92. Now, if at the end of the third integration interval, no error is detected, the signal from counter 87 will reset flip-flop 94 through differentiator 103 and diode 103a since no signal is generated from comparator 90. Thus, gate 99 will not be opened to allow correction of the computed signals read out from memory 75 corresponding to the second integration interval during the fourth integration interval.

The read-out computed signal $C_{n-d_1}$ is corrected by the apparatus comprising OR gate 104, differentiator 105, diode 105a and gate 106. That is, if the logic circuitry has determined that there is a correction to be made, gate 106 is opened by the positive going pulse from diode 105a for a short interval to allow this correction to be made one time only in differential amplifier 38a (FIGURE 1).

Looking at FIGURE 10, there is shown a plot of the error correction signal $\pm E/2d$ over the three exampled integration intervals discussed above, as represented by the depth intervals $d_9$, $d_9'$ and $d_9''$. Assuming that the error correction signal $E/2d$ for the integration interval preceding the integration interval $d_9$ was less than the reference value V, there will be no error correction operation at the end of this first integration interval $d_9$. However, since the error correction signal for the second integration interval $d_9'$ has exceeded the reference value V, the read-out computed signal from memory 75 will be corrected at the end of this second integration interval via gate circuit 106 and the computed values stored in memory corresponding to the first integration interval $d_9$ will be corrected via OR gate 100. Now, on the third integration interval $d_9''$, since the error correction signal magnitude is less than the reference value V, no correction will take place of either the computed signal $C_{n-d_1}$ read out from memory 75 at read-out point 75b or the computed signals corresponding to the second integration interval $d_9'$.

If desired, suitable logic circuitry could be implemented for the error correction process to take place only if the error correction signal of the presently investigated interval is equal to at least the error correction signal of the last preceding integration interval. This is represented in FIGURE 9 by the dotted line circuitry and conductors, with the X's indicating those conductors which are not present in this alternative embodiment. In this alternative embodiment, a comparator 107 compares the presently determined error correction signal $\pm E/2d$ with the error correction signal from the preceding integration interval. The preceding integration interval is determined by switching circuit 108 which is connected to the outputs of memories 91 and 92. In this alternative arrangement of FIGURE 9, the output signal from comparator 107 is supplied to the set input of flip-flop 94 to initiate the error correction operation, in place of the output from comparator 90. The output from comparator 90 is still applied to the gate circuit 98 to insure that the error signal has a magnitude at least as great as the reference level V.

In the preceding embodiments, the interval between capacitors hereinafter called memory stations, has been equal to the interval $d_1$ between the computing stations represented by the arrows $S_n$ and $C_{n-d_1}$. The interval between depth levels at which the derived well logging signals $S_n$ from the downhole investigating apparatus 15 were sampled, as determined by one-shot 44 energizing gate 25, is the same depth interval $d_1$ since the sampled well logging signals should be supplied to weighted adding network 26 with each read-out computed signal $C_{n-d_1}$ from memory 27 or 75. It may be desirable to sample the derived well logging signals at closer intervals than this interval $d_1$ between computing stations. However, when the derived well logging signals are sampled at such close intervals, only one error detection circuit, as shown in the above embodiments, may not suffice. The reason for this is that any error showing up in a computed signal which is written into memory 27 or 75 will not show up again for an interval $d_1$ later, since the computed signal having the error is not read out of memory until an interval $d_1$ later. Thus, this error will not show up in those computed signals corresponding to the depth levels which are other than intervals $nd_1$ apart, where $n$ in a positive integer.

Turning now to FIGURE 11, there is shown circuitry for sampling the derived well logging signals at depth intervals of less than the distance between computing stations $d_1$. The circuit elements in FIGURE 11 which have the same function as circuit elements in FIGURE 1 have the same numerical designations thereof. The derived signal $S_n$ from differential amplifier 24 (FIGURE 1) is supplied through the gate 25 to weighted adding network 26 and write amplifier 28 to a write-in contact 110a of a rotating capacitor memory 110 which is rotated in a clockwise direction by the shaft from differential gear 32 (FIGURE 1). Memory 110 has memory stations at intervals of $d_1/3$ apart. Located a clockwise interval $d_1$ from write-in contact 110a is a read-out contact 110b which reads out the computed signal $C_{n-d_1}$. This read-out computed signal $C_{n-d_1}$ is supplied through the gate 35 and differential amplifier 37a to weighted adding network 26 to be combined with the derived signal $S_n$ in the same manner as in the FIGURE 1 apparatus. The read-out computed signal $C_{n-d_1}$ is subtracted from the computed signal $C_n$ in differential amplifier 36 and the output supplied to inverter 38 and switching circuit 37 in the same manner as in FIGURE 1. In addition to the FIGURE 1 apparatus, there is shown in FIGURE 11, a three position switching circuit 111 whose three outputs are supplied to separate parallel error logic circuits 112, 113, and 114 which comprises the error circuitry 51a of FIGURE 1 (or one of the other circuit 51a', 51a''). The timing signals for these three error detection circuits are supplied from a suitable switching circuit 115, like switching circuit 111, which supplies the pulses from a depth pulse generating means 116 (via one-shot 44) which is similar to depth pulse generating means 43 of FIGURE 1, except that pulse means 116 generates pulses at depth intervals of $d_1/3$ (i.e., the signals from switching circuit 115 to error logic circuits 112, 113 and 114 take the place of the signals from one-shot 44 to circuit 51a of FIGURE 1). The three error correction signal outputs from the error detection circuits 112, 113, and 114 are supplied to an OR gate 117, whose output is supplied to the differential amplifier 37a through the switching circuit 50 and inverter 51. To control switching circuits 37 and 50, the pulses from one-shot 44 are scaled-down by a factor of three by a suitable scaling device 118, which could comprise for example a plurality of series connected flip-flops.

In operation, the switching circuits 37 and 50 cause a reversal of polarity of both the difference signals and generated error correction signal, if any, after each depth interval $d_1$. The switching circuits 111 and 115 however switch between the various error detection circuits 112, 113, and 114 at depth intervals of $d_1/3$. This insures, then, that the proper error correction signal is combined in differential amplifier 37a with the proper read-out computed signal. That is to say, taking an example, integrator 40 of error detection circuit 112 will be responsive to only those computed signals $C_n$, $C_{n-d_1}$, $C_{n-2d_1}$, etc., integrator 40 of circuit 113 will be responsive to only the computed signals $C_{n+d_1/3}$, $C_{n-2/3d_1}$, $C_{n-5/3d_1}$, etc., and integrator 40 of circuit 114 will only be responsive to the computed signals $C_{n+2/3d_1}$, $C_{n-1/3d_1}$, $C_{n-4/3d_1}$, etc.

It is to be understood that any of the above embodiments could be incorporated into the FIGURE 11 embodiment. For example, the FIGURE 11 apparatus could be converted to correct the computed values stored in memory as in the FIGURE 8 apparatus, etc.

Looking now at FIGURE 12, there is shown apparatus for performing the error detection and correction operation of the present invention in combination with a three station computer constructed in accordance with the teachings of the above-mentioned Schuster copending application Ser. No. 605,424. In FIGURE 12, there is shown a downhole investigating apparatus 120 having a measure or recording point "0" and supported in the borehole by the cable 17. Shown to the right of the downhole investigating apparatus 120 is the V.G.F. $G_6$ of this downhole investigating apparatus 120 when it is at the depth level shown in FIGURE 12. The arrow designated $S_n$ represents the recording point of the V.G.F. $G_6$, $S_n$ being the signal designation for the derived signal produced by the V.G.F. $G_6$. The original apparatus V.G.F. $G_6$ is broken down into three component parts designated $G_{c3}$, $G_{c4}$ and $G_{c5}$ having the signal designations $C_n$, $C_{n-d_1}$, and $C_{n-2d_1}$ and areas A, B, and D respectively. In accordance with the previously mentioned copending Schuster application Ser. No. 605,424, the computed signals $C_{n-d_1}$ and $C_{n-2d_1}$ are subtracted in the proper weights from the derived signal $S_n$ to produce the computed signal $C_n$. In V.G.F. terms, the component V.G.F.'s $G_{c4}$ and $G_{c5}$ are subtracted from the original apparatus V.G.F. $G_6$ to leave the component V.G.F. $G_{c3}$, but are again shown in an upright position to more clearly show how they subtract from $G_6$.

Looking now at FIGURE 13, there is shown the V.G.F. $G_6$ (shown in rectangular form for simplicity) at a plurality of depth positions opposite a plurality of earth formation slabs designated $\sigma_{n+3d_1}$ through $\sigma_{n-2d_1}$. The earth formation slabs are of thickness $d_1$ to correspond with the vertical extent of the V.G.F. components $G_{c3}$, $G_{c4}$ and $G_{c5}$. The original apparatus V.G.F.'s shown in FIGURE 13 correspond to the downhole investigating apparatus 120 of FIGURE 12 being at intervals $d_1$ apart.

The equation for the derived signal $S_n$ can be written as:

$$S_n = A\sigma_n + B\sigma_{n-d_1} + D\sigma_{n-2d_1} \quad (12)$$

Now, substituting the computed signal designation $C_n$, $C_{n-d_1}$, and $C_{n-2d_1}$ for the corresponding conductivity values:

$$S_n = AC_n + BC_{n-d_1} + DC_{n-2d_1} \quad (13)$$

Solving Equation 13 for the computed value $C_n$:

$$C_n = \frac{1}{A}S_n - \frac{B}{A}C_{n-d_1} - \frac{D}{A}C_{n-2d_1} \quad (14)$$

Since the areas A, B and D are equal to one another, it is clear that $A = B = D = \frac{1}{3}$ since $A+B+D$ must equal "1" for normalization.

Now rewriting Equation 14 in terms of these numerical values for A, B, and D:

$$C_n = 3S_n - C_{n-d_1} - C_{n-2d_1} \quad (15)$$

Now combining Equations 12, 13 and 15:

$$C_n = \sigma_n + \sigma_{n-d_1} + \sigma_{n-2d_1} - \sigma_{n-d_1} - \sigma_{n-2d_1} = \sigma_n \quad (16)$$

This procedure could be followed to solve for the other computed signals $C_{n-d_1}$, $C_{n-d_2}$, etc., in the same manner.

Now assume that the computed values $C_{n-d_1}$ and $C_{n-2d_1}$ are not equal to the conductivity values $\sigma_{n-d_1}$ and $\sigma_{n-2d_1}$, but instead are equal to:

$$C_{n-d_1} = \sigma_{n-d_1} + e_1 \quad (17)$$

and $$C_{n-2d_1} = \sigma_{n-2d_1} + e_2 \quad (18)$$

where $e_1$ and $e_2$ are error components. Now substituting Equations 17 and 18 into Equation 15:

$$C_n = \sigma_n - e_1 - e_2 \quad (19)$$

This same procedure can be utilized to solve for the computed values $C_{n+d_1}$, $C_{n+2d_1}$, $C_{n+3d_1}$, etc. By combining the proper equations, these computed signals are:

$$C_{n+d_1} = 3S_{n+d_1} - C_n - C_{n-1} = \sigma_{n+d_1} + e_2 \quad (20)$$

$$C_{n+2d_1} = 3S_{n+2d_1} - C_{n+1} - C_n = \sigma_{n+2d_1} + e_1 \quad (21)$$

$$C_{n+3d_1} = 3S_{n+3d_1} - C_{n+2d_1} - C_{n-d_1} = \sigma_{n+3d_1} - e_1 - e_2 \quad (22)$$

It can be seen from Equations 17–22 that the error propagates through the computed values in the following sequence: $+e_2$, $+e_1$, $-e_1-e_2$, $+e_2$, $+e_1$, $-e_1-e_2$, etc.

To detect these errors propagating through the earth formation conductivity values, the following expression can be utilized:

$$C_n - \tfrac{1}{2}C_{n-d_1} - \tfrac{1}{2}C_{n-2d_1} \quad (23)$$

It can be seen that, if no error components are present, Equation 23 will produce zero integrated voltage is considered over a sufficiently long depth interval. Now, combining Equations 17, 18 and 19 with Expression 23:

$$C_n - \tfrac{1}{2}C_{n-1} - \tfrac{1}{2}C_{n-2} = \sigma_n - e_1 - e_2$$
$$\quad - \tfrac{1}{2}\sigma_{n-d_1} - \tfrac{1}{2}e_1 - \tfrac{1}{2}\sigma_{n-2d_1} - \tfrac{1}{2}e_2 \quad (24)$$

In like fashion, when Expression 23 is applied to the computed values corresponding to other depth levels, the following equations can be written:

$$C_{n+d_1} - \tfrac{1}{2}C_n - \tfrac{1}{2}C_{n-d_1} = \sigma_{n+d_1} + e_2 - \tfrac{1}{2}\sigma_n$$
$$\quad + \tfrac{1}{2}e_1 + \tfrac{1}{2}e_2 - \tfrac{1}{2}\sigma_{n-d_1} - \tfrac{1}{2}e_1 \quad (25)$$

$$C_{n+2d_1} - \tfrac{1}{2}C_{n+d_1} - \tfrac{1}{2}C_n = \sigma_{n+2d_1} + e_1$$
$$\quad - \tfrac{1}{2}\sigma_{n+d_1} - \tfrac{1}{2}e_2 - \tfrac{1}{2}\sigma_n + \tfrac{1}{2}e_1 + \tfrac{1}{2}e_2 \quad (26)$$

$$C_{n+3d_1} - \tfrac{1}{2}C_{n+2d_1} - \tfrac{1}{2}C_{n+d_1} = \sigma_{n+3d_1}$$
$$\quad - e_1 - e_2 - \sigma_{n+2d_1} - \tfrac{1}{2}e_1 - \tfrac{1}{2}\sigma_{n+d_1} - \tfrac{1}{2}e_2 \quad (27)$$

Now, if the earth formations are investigated over a sufficiently long depth interval, it is seen that the conductivity portions of Equations 24, 25, 26 and 27 will be substantially equal to 0. This is based on the theory of probability again, as before. Looking at just the error components in Equations 24, 25, 26, 27, it can be seen that the errors $e_1$ and $e_2$ will propagate in the following sequence in Equations 24 through 27: $-1.5e_1 - 1.5e_2$, $+1.5e_2$, $+1.5e_1$, $-1.5e_1 - 1.5e_2$, etc. This known propagation of the errors in Equations 24–27 provides the basis for detecting and correcting the errors in the computed values. Comparing Equations 24 through 27 with Equations 19 through 22, it can be seen that the error components in both sets of equations are proportional to each other by a factor of 1.5, using the full computed signal value as the recording point or depth level for Equations 24 through 27, i.e., $n$ is the recording level for Equation 24, $C_{n-d_1}$ for Equation 25, etc.

Referring again to FIGURE 12, the signals derived from the downhole investigating apparatus 120 are supplied through the cable 17 to the differential amplifier 24 at the surface of the earth in the same manner as in FIGURE 1. The derived signal $S_n$ from differential amplifier 24 is supplied to a weighted adding network 123, whose computed output signal $C_n$, along with being supplied to a suitable recorder, is written into a suitable rotating memory 124 through the write amplifier 28 at write-in contact 124a. Rotating memory 124 is driven in a clockwise direction. The computed signals $C_{n-d_1}$ and $C_{n-2d_1}$ are read-out of rotating memory 124 at read-out points 124b and 124c through read-out amplifiers 125 and 126 respectively and applied through gates 121 and 122 and differential amplifiers 134 and 130 to the weighted adding network 123. Gates 25, 121 and 122 are energized from the one-shot 44, as in FIGURE 1. The circuitry just described represents the three station computing process disclosed in the previously mentioned copending Schuster application Ser. No. 605,424. The weighting functions (not shown) of weighted adding network 123 to which the signals $S_n$, $C_{n-d_1}$ and $C_{n22d_1}$ are applied are $1/A, -B/A$, and $D/A$ respectively, from Equation 14.

Now concerning the error detection and correction portion of FIGURE 12, the computed signals $C_n$, $C_{n-d_1}$, and $C_{n-2d_1}$ are supplied to a weighting network 127 which applies the 1, $-\frac{1}{2}$, and $-\frac{1}{2}$ to weighting functions to these three computed signals in accordance with Equation 23. The output of weighting circuit 127 is supplied to the wiper arm of a three position stepping switch 128 having switch positions $S_1$, $S_2$ and $S_3$. The switch positions $S_1$, $S_2$ and $S_3$ are supplied to error detection circuits 129, 129a and 129b respectively. These three error detection logic circuits 129, 129a and 129b are identically constructed, only the error detecting logic circuit 129 being shown in detail. The circuitry for the error detecting logic circuit 129 is the same as error detecting logic circuit 51a of FIGURE 1, with the exception that the scaling circuit 41a of FIGURE 1, which has a weight of ½ in FIGURE 1, has a weight of ⅔ in FIGURE 12 and is designated 130.

In FIGURE 12, the AND gate 42 in each of the error detecting logic circuits 129, 129a and 129b are tied together so that an error detected in one circuit will produce error correction signals in all three circuits. The outputs from circuits 129, 129a and 129b, taken from the ratio circuit 49 of each of these circuits, are supplied in a desired manner to three position stepping switches 128a and 128b. The signals from the wiper arms of stepping switches 128a and 128b are supplied to the negative inputs of differential amplifiers 134 and 130 respectively. The wiper arms of switches 128 and 128a and 128b are stepped in a ganged fashion whenever a pulse is received by the solenoid 128c from one-shot 44. Thus, the switches are stepped at depth intervals of $d_1$. (Again, switches 128, 128a and 128b are shown as stepping switches for clarity, but should be fast switching electronic switches.)

In operation, the stepping switch 128 causes the output signal from weighting circuit 127, which should be equal to 0 over a sufficiently long interval if no error is present, to be applied to each of the circuits 129, 129a and 129b, thus causing the integrators 40 of each of these circuits to build up an output voltage proportional to any error in the computed signals. If an error is detected by one of the error detection logic circuits, error correction signals are supplied to differential amplifiers 134 and 130 from one of the error detection logic circuits via switches 128a and 128b to correct any error which may exist in the read-out computed signals $C_{n-d_1}$ and $C_{n-2d_1}$. This then insures that the new computed signal $C_n$ written in to memory 124 is accurate. However, the computed signal $C_{n-d_1}$ stored in memory 124 may have an error which was not corrected, and which error will show up again when this computed signal is at read-out point 124c (computed signal $C_{n-d_1}$ now being designated $C_{n-2d_1}$). Thus, the error correction signal for the read-out computed signal $C_{n-d_1}$ is stored in a suitable memory 131 after a delay by delay circuit 132. This delay prevents the error correction signal being applied to differential amplifier 134 from feeding into differential amplifier 130. Now, when the computed signal $C_{n-2d_1}$ is read out of memory 124 to be applied to the weighted adding network 123, the error correction signal stored in memory 131 is applied to differential amplifier 130 through a suitable gate 133 energized by one-shot 44 to provide the necessary correction. Now, all of the computed signals stored in memory 124 are accurate.

Taking an example of this operation, assume that when the switch 128 is in the $S_1$ position, the error component from weighing circuit 127 is $-1.5e_1-1.5e_2$; when in the $S_2$ position, it is $1.5e_2$; and when in the $S_3$ position, it is $1.5e_1$; and back in the $S_1$ position it is again $-1.5e_1-1.5e_2$, etc. in accordance with Equations 24, 25, 26. In this example, it is clear that the integrator 40 of error detection circuit 129 will build up a negative voltage at a greater rate than the integrators 40 of error detecting circuits 129a and 129b. Thus, after a given depth interval, AND gate 42 of error detection circuit 129 will produce an output signal, thus indicating an error, when the switch is in the $S_1$ position. When the switch is in the $S_1$ position, it is clear that the error detection logic circuit 129b connected to the $S_3$ position corresponds to the computed signal an interval $d_1$ earlier and thus the error correction signal from the circuit 129b will pass through the $S_1'$ switch position of switch 128a to differential amplifier 134 to correct the computed signal $C_{n-d_1}$ read out from memory 124. Since the switch position $S_3$ has been supplying an error signal $1.5e_1$ to error detection logic circuit 129b, the error correction signal generated from circuit 129b will be $+e_1$ (the weighting circuit 130 taking out the 1.5). The differential amplifier 134 will invert the polarity of $e_1$ to $-e_1$ so as to cancel out this error $+e_1$.

In like fashion, when the switch 128 is at switch position $S_1$, the switch position $S_2$ corresponds to the computed signal an interval $2d_1$ earlier, and thus error detection logic circuit 129a generates an error correction signal $+e_2$ through the switch position $S_1''$ of switch 128b to differential amplifier 130 to correct the error in the computed signal $C_{n-2d_2}$ read out from memory 124. Now, at an interval $d_1$ after this error correction operation, the signal $e_1$ from circuit 129b, which has been stored in memory 131, is gated out of memory 131 by gate 133 to be combined with the read out computed signal $C_{n-2d_1}$ in differential amplifier 130. In like fashion, if one of the other error detection circuits indicates an error first, the switch being in position $S_2$ or $S_3$, one, with a little thought, can follow the conductors through switches 128a and 128b to see how the errors are corrected. Obviously, either $e_1$ or $e_2$ may be absent in any given situation.

If desired, the error correction signals generated from error circuits 129, 129a and 129b could be utilized to correct all of the computed singals stored in memory which have an error component. Shown to the right of V.G.F. $G_6$ in FIGURE 12 are a plurality of depth levels designated from the bottom up $S_1$, $S_2$, $S_3$, $S_1$, etc. These depth levels are intervals $d_1$ apart and correspond to the similarly designated switch positions of switch 128. Thus, it can be seen that, to reset the computed signals stored in memory, it is merely necessary to take the error correction signal from circuit 129 and reset the computed signal stored in memory corresponding to every depth position $S_1$; the error correction signal from circuit 129a to correct the computed signal stored in memory corresponding to every depth level designated $S_2$; and the error correction signal from circuit 129b to correct the computed signals corresponding to the computed signals corresponding to the depth levels designated $S_3$. The circuitry for correcting the computed signals stored in memory has not been shown in FIGURE 12 but should be obvious in construction when considering FIGURES 8 and 12 in conjunction. Additionally, the multiple sampling feature shown in FIGURE 11 could be utilized in connection with FIGURE 12, as could any of the other embodiments disclosed above.

One skilled in the art, once armed with the teachings of the present invention, could readily apply these teachings to derive the necessary equations and construct the necessary apparatus to provide error correction circuitry in connection with four station computing techniques, five station, etc. shown in the copending Schuster application. Likewise, other logic techniques to discover the error could be utilized than the ones specifically disclosed.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. Apparatus for processing well logging signals, comprising:
   (a) means for deriving signals representative of a characteristic of the earth formations surrounding a borehole, each of the derived signals being representative of the characteristic in a given portion of a formation;
   (b) combining means for combining selected derived signals with at least one other signal to provide computed signals representative of the formation characteristic at depth levels correlated with the depth levels of the derived signals, and wherein said computed signals may include an error component;
   (c) memory means for storing the computed signals;
   (d) means for reading out the computed signals from the memory means and supplying at least one read-out computed signal to the combining means as said at least one other signal for combination with the derived signals to cancel out a selected portion of the formation response characteristic of each derived signal; and
   (e) error suppression means responsive to the relative amplitudes of selected computed signals, at least one of which is a read-out computed signal, for detecting the presence of an error in the computed signals and cancelling out the detected error in at least one computed signal.

2. The apparatus of claim 1 wherein the error suppression means includes:
   (1) detecting means responsive to the computed signals for detecting the presence of an error in the computed signals;
   (2) means for computing the magnitude and relative polarity of the error upon the presence of an error being detected by the detecting means;
   (3) means for generating an error correction signal of substantially the same magnitude as the computed error and of a polarity to substantially cancel out the detected error in the computed signals; and
   (4) means responsive to the generated error correction signal for cancelling out the detected error in at least one computed signal.

3. The apparatus of claim 2 wherein the detecting means includes:
   (1) means responsive to the computed signals for providing an integrated function of the computed signals; and
   (2) means responsive to the integrated function of the computed signals for determining the presence of an error in the computed signals and enabling the error to be computed and the error correction signal generated.

4. The apparatus of claim 2 wherein the detecting means includes:
   (1) means for subtracting each computed signal from the combining means from at least one read-out computed signal read out from the memory means to provide difference signals;
   (2) means for sequentially varying the polarity of the difference signals;
   (3) means for integrating the varying polarity difference signals; and
   (4) means responsive to the integrated varying polarity difference signals for determining the presence of an error in the computed signals and enabling the error to be computed and the error correction signal supplied to the combining means to cancel out the error.

5. The apparatus of claim 3 wherein the error suppression means further includes:
   (1) means responsive to the integrated function for computing the magnitude and relative polarity of the error upon the presence of an error being indicated by the detecting means; and
   (2) means for supplying to the combining means an error correction signal of substantially the same magnitude as the detected error and of the proper polarity so as to substantially cancel out the error in the computed signals.

6. The apparatus of claim 3 wherein the means responsive to the integrated function for determining the presence of an error in the computed signals includes:
   (1) comparator means for generating an output signal upon the integrated function exceeding a predetermined threshold level; and
   (2) means responsive to the output signal for enabling the error to be computed and the error correction signal generated.

7. The apparatus of claim 3 wherein the detecting means further includes means responsive to the derived well logging signals for inhibiting the computed signals from being integrated when the derived signals are widely fluctuating as a function of depth.

8. The apparatus of claim 2 wherein the detecting means is responsive to a nonlinear function of the computed signals, the nonlinear function being of the type which minimizes high level signals.

9. The apparatus of claim 3 wherein the means responsive to the integrated function for determining the presence of an error in the computed signals includes:
   (1) comparator means for generating a first output signal upon the integrated function exceeding a predetermined threshold level;
   (2) means for generating a second output signal after signals have been derived over a given depth interval of the borehole; and
   (3) means for enabling the error to be computed and the error correction signal generated in response to both the first and second output signals.

10. The apparatus of claim 9 wherein the second output signal resets the integrator means so that the integration of the computed signals is started over again if the presence of an error has not been detected within said given depth interval of the borehole.

11. The apparatus of claim 3 wherein the means for computing the magnitude and relative polarity of the error includes:
   (1) means for providing a depth signal representative of the elapsed depth interval from a selected reference depth level; and
   (2) means responsive to the depth signal and the integrated function for computing the error in the computed signals.

12. The apparatus of claim 11 wherein the means for computing the magnitude and relative polarity of the error further includes means responsive to the integrated function for controlling the selected reference depth level of the means for providing a depth signal so that the depth signal supplied to the means for computing the error will be approximately proportional to the elapsed depth interval for which the error was present in the computed signals.

13. The apparatus of claim 12 wherein the means for controlling the selected reference depth level includes:
   (1) means for generating an output control signal upon the absolute value of the integrated function exceeding a given reference level; and
   (2) means responsive to the output control signal for changing the selected reference depth level so that the selected reference depth level will more nearly coincide with the depth level at which the error began.

14. The apparatus of claim 2 wherein the means for cancelling the detected error further includes means responsive to the generated error correction signal for correcting substantially all of the stored computed signals having the detected error.

15. The apparatus of claim 14 wherein the means for correcting the stored computed signals includes:
(1) means for storing the generated error correction signal; and
(2) second combining means for combining the stored error correction signals with selected computed signals read out from the memory means so that substantially all of the erroneous computed signals will be corrected.

16. The apparatus of claim 1 wherein the error suppression means includes:
(1) first means responsive to selected computed signals for detecting the presence of an error in the computed signals in accordance with a first criteria and supplying a first error correction signal to the combining means to cancel out the detected error; and
(2) second means responsive to selected computed signals for detecting the presence of an error in the computed signals in accordance with a second criteria and supplying a second error correction signal for correcting the computed signals stored in the memory means.

17. The apparatus of claim 1 wherein the error suppression means includes:
(1) means for subtracting each computed signal from the combining means from at least one read-out computed signal read out from the memory means to provide difference signals;
(2) means for sequentially varying the polarity of the difference signals;
(3) means for integrating the varying polarity difference signals over a given depth interval;
(4) means responsive to the integrated varying polarity difference signals for generating an error correction signal if an error is detected in the computed signals;
(5) first memory means for storing the error correction signal; and
(6) means for enabling the error correction signal to be supplied to the combining means to cancel out the detected error in the computed signals in response to an error being detected in a second successive depth interval.

18. The apparatus of claim 1 wherein the error suppression means includes a plurality of means for detecting the presence of an error and cancelling out the detected error, each of said plurality of means being responsive to selected computed signals for detecting the presence of an error in the computed signals corresponding to selected depth levels in the borehole and cancelling out the errors for the selected depth levels.

19. The apparatus of claim 1 wherein at least two computed signals are read out of the memory means and combined with the derived signals, the error suppression means including:
(1) means for combining a plurality of the computed signals, at least two of which comprise read-out computed signals;
(2) means for integrating the combined computed signals; and
(3) means responsive to the integrated combined computed signals for detecting the presence of an error and enabling the correction of the error in at least one computed signal.

20. A method of processing well logging signals, comprising:
(a) deriving signals representative of a characteristic of the earth formations surrounding a borehole, each of the derived signals being representative of the characteristic in a given portion of a formation;
(b) combining selected derived signals with at least one other signal to provide computed signals representative of the formation characteristic at given depth levels, which depth levels are correlated with the depth levels for the derived signals;
(c) storing the computed signals in a memory means;
(d) reading out the computed signals from the memory means and using at least one read-out computed signal as said at least one other signal which is combined with each derived signal to cancel out a selected portion of the formation response characteristic of each derived signal; and
(e) detecting the presence of an error in the computed signals in response to the relative amplitudes of selected computed signals, at least one of which is a read-out computed signal, and cancelling out the detected error in at least one computed signal.

21. The method of claim 20 wherein the step of detecting the presence of an error and cancelling out the detected error includes:
(1) detecting the presence of an error in the computed signals in response to the computed signals;
(2) computing the magnitude and relative polarity of the detected error upon detection of the presence of an error;
(3) generating an error correction signal of the same magnitude as the computed error and of a polarity to cancel out the detected error; and
(4) cancelling out the detected error in at least one computed signal in response to the error correction signal.

22. The method of claim 21 wherein the step of detecting the presence of an error in the computed signals includes:
(1) subtracting each computed signal from at least one read-out computed signal to provide difference signals;
(2) sequentially varying the polarity of the difference signals;
(3) integrating the varying polarity difference signals; and
(4) enabling the computation of the error and generation of the error correction signal in response to the integrated varying polarity difference signals.

23. The method of claim 22 wherein the step of enabling the computation of the error and generation of the error correction signal comprises comparing the absolute value of the integrated varying polarity difference signals with a given reference value and generating the error correction signal when the integrated signals exceed the reference value.

24. The method of claim 21 wherein at least two computed signals are read out for combination with the derived signals, the step of detecting the presence of an error including:
(1) combining a plurality of computed signals, at least two of which comprise read-out computed signals;
(2) integrating the combined computed signals; and
(3) enabling the correction of said at least one computed signal in response to the integrated combined computed signals.

25. Apparatus for processing well logging signals comprising:
(a) means for deriving signals representative of a characteristic of earth formations surrounding a borehole at different depth levels in the borehole, each derived signal being representative of said characteristic over a given vertical increment;
(b) means for combining each derived signal with at least one other signal to provide computed signals representative of the characteristic at depth levels correlated with the depth levels of the derived signals, each computed signal being representative of said characteristic over a vertical increment which is less than the vertical increment for each derived signal and wherein the computed signals may have an error component;

(c) memory means for storing the computed signals;
(d) means for reading out individual stored computed signals from the memory means for application to the combining means as said at least one other signal, each combined read-out computed signal operating to cancel out a selected portion of the vertical increment over which each derived signal is representative of the characteristic so as to leave a smaller vertical increment of response for each computed signal; and
(e) error suppression means responsive to a given propagation characteristic of the computed signals as a function of borehole depth for detecting an error in the computed signals and cancelling said error from at least one of the computed signals.

26. A method of processing well logging signals comprising:
(a) deriving signals representative of a characteristic of earth formations surrounding a borehole at different depth levels in the borehole, each derived signal being representative of said characteristic over a given vertical increment;
(b) combining each derived signal with at least one other signal to provide computed signals representative of the characteristic at depth levels correlated with the depth levels of the derived signals, each computed signal being representative of said characteristic over a vertical increment which is less than the vertical increment for each derived signal and wherein the computed signals may have an error component;
(c) storing the computed signals in a memory means;
(d) reading out individual stored computed signals from the memory means and using individual ones of said read-out signals as said at least one other signal, each combined read-out computed signal operating to cancel out a selected portion of the vertical increment over which each derived signal is representative of the characteristic so as to leave a smaller vertical increment of response for each computed signal;
(e) detecting if the computed signals vary in a given fashion as a function of borehole depth and generating an error correction signal in response to such a given variation; and
(f) combining the error correction signal with at least one computed signal to thereby correct said at least one computed signal for a detected error.

References Cited

UNITED STATES PATENTS

| | | | |
|---|---|---|---|
| 3,166,709 | 1/1965 | Doll | 324—6 |
| 3,181,117 | 4/1965 | Sloughter | 324—1 XR |
| 3,230,445 | 1/1966 | Sloughter et al. | 324—6 |
| 3,321,700 | 5/1967 | Zimmerman | 324—8 |
| 3,356,990 | 12/1967 | Sloughter | 324—1 XR |
| 3,391,334 | 7/1968 | Ruehle | 324—8 |

GERARD R. STRECKER, Primary Examiner